(12) United States Patent
Aubrion et al.

(10) Patent No.: US 11,525,434 B2
(45) Date of Patent: Dec. 13, 2022

(54) LIGHTNING PROTECTION OF A SECTIONED WIND TURBINE BLADE

(71) Applicant: LM WIND POWER A/S, Kolding (DK)

(72) Inventors: Mathilde Aubrion, Kolding (DK); Boas Eiriksson, Kolding (DK)

(73) Assignee: LM WIND POWER A/S, Kolding (DK)

(*) Notice: Subject to any disclaimer, the term of this patent is extended or adjusted under 35 U.S.C. 154(b) by 0 days.

(21) Appl. No.: 17/285,783

(22) PCT Filed: Oct. 24, 2019

(86) PCT No.: PCT/EP2019/079030
§ 371 (c)(1),
(2) Date: Apr. 15, 2021

(87) PCT Pub. No.: WO2020/084053
PCT Pub. Date: Apr. 30, 2020

(65) Prior Publication Data
US 2021/0381493 A1 Dec. 9, 2021

(30) Foreign Application Priority Data

Oct. 25, 2018 (EP) .................................... 18202668

(51) Int. Cl.
*F03D 80/30* (2016.01)
*F03D 1/06* (2006.01)

(52) U.S. Cl.
CPC ........... *F03D 80/30* (2016.05); *F03D 1/0675* (2013.01); *F05B 2230/238* (2013.01); *F05B 2240/302* (2013.01); *F05B 2280/6003* (2013.01)

(58) Field of Classification Search
CPC . F03D 80/30; F05B 2240/302; F05B 2240/85
See application file for complete search history.

(56) References Cited

U.S. PATENT DOCUMENTS

| 7,494,324 B2 * | 2/2009 | Hibbard | ................. H02G 13/80 |
| | | | 416/241 A |
| 10,107,257 B2 | 10/2018 | Yarbrough et al. | |

(Continued)

FOREIGN PATENT DOCUMENTS

| CN | 108547744 A | * | 9/2018 | |
| DE | 29522152 U1 | * | 3/2000 | ............. F03D 80/30 |

(Continued)

OTHER PUBLICATIONS

English translation of CN108547744A (Year: 2018).*

(Continued)

*Primary Examiner* — Woody A Lee, Jr.
*Assistant Examiner* — Wesley Le Fisher
(74) *Attorney, Agent, or Firm* — Nath, Goldberg & Meyer; Jerald L. Meyer; Tanya E. Harkins

(57) ABSTRACT

Disclosed is wind turbine blade and a spar beam for structurally connecting a first blade section and a second blade section of a wind turbine blade. The spar beam comprises a first fibre reinforced element extending parallel to a spar beam axis. The spar beam comprising a conductive beam sheath circumscribing at least a beam sheath angular distance of the spar beam about the spar beam axis and longitudinally extending from a fourth beam axis position to a fifth beam axis position. The first fibre reinforced element is positioned between the conductive beam sheath and the spar beam axis.

20 Claims, 12 Drawing Sheets

(56) References Cited

U.S. PATENT DOCUMENTS

| | | | |
|---|---|---|---|
| 10,584,684 B2* | 3/2020 | Nielsen | F03D 1/0675 |
| 10,830,214 B2* | 11/2020 | Akhtar | F03D 80/30 |
| 11,248,587 B2* | 2/2022 | Christiansen | F03D 80/30 |
| 2011/0091326 A1* | 4/2011 | Hancock | F03D 1/0683 |
| | | | 29/889.7 |
| 2014/0286780 A1* | 9/2014 | Lemos | F03D 80/50 |
| | | | 29/889.71 |
| 2021/0332788 A1* | 10/2021 | Sato | F03D 80/30 |
| 2021/0381484 A1* | 12/2021 | Collier | F03D 1/0675 |
| 2021/0381494 A1* | 12/2021 | Aubrion | F03D 80/30 |

FOREIGN PATENT DOCUMENTS

| | | | | |
|---|---|---|---|---|
| EP | 2649690 A1 | 10/2013 | | |
| EP | 2770197 A2 * | 8/2014 | ............ | F03D 80/00 |
| EP | 2789851 A1 | 10/2014 | | |
| EP | 2675030 B1 * | 3/2017 | ............ | F03D 80/30 |
| EP | 3299618 A1 * | 3/2018 | ............ | F03D 80/30 |
| FR | 3044349 A1 | 6/2017 | | |
| WO | 2013/007267 A1 | 1/2013 | | |

OTHER PUBLICATIONS

English translation of EP2675030B1 (Year: 2017).*
English translation of DE29522152U1 (Year: 2000).*
International Search Report dated Jan. 21, 2020 issued in International Application No. PCT/EP2019/079030.
Search Report dated Apr. 12, 2019 issued in corresponding European Application No. 18202668.2.

* cited by examiner

LIGHTNING PROTECTION OF A SECTIONED WIND TURBINE BLADE

This is a National Phase Application filed under 35 U.S.C. 371 as a national stage of PCT/EP2019/079030, filed Oct. 24, 2019, an application claiming the benefit of European Application No. 18202668.2, filed Oct. 25, 2018, the content of each of which is hereby incorporated by reference in its entirety.

The present disclosure relates to lightning protection of a wind turbine blade, more specifically the disclosure relates to lightning protection of a wind turbine blade comprising a first blade section and a second blade section, and optionally more blade sections.

BACKGROUND

As wind turbines and wind turbine blades increase in size, the risk of lighting striking the wind turbine increases. It is therefore of increasing interest to provide wind turbines and in particular wind turbine blades with lightning protection measures.

It is known to provide blades for wind turbines with lightning receptors that are, inside the blade, in electric connection with a metallic down conductor that is able to connect a lightning current to earth.

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, the two halves are positioned on top of each other, and the two halves are glued together. The blade parts may be positioned on top of each other by turning and repositioning the complete half mould.

As the demand for blades for wind turbines tends towards blades of increasing lengths, a need concurrently arises for manufacture of blades having increased rigidity and a comparatively lower weight. One way of achieving these properties it to combine various types of fibres in the laminate of the blades, for instance it is an option to combine glass fibres and carbon fibres, and likewise carbon fibres or glass fibres may advantageously be combined with steel fibres. Combinations with other types of fibres are thus also possible and it is also an option to exclusively employ carbon fibres or other suitable fibre type. Combination of e.g. glass fibres with carbon fibres in a so-called hybrid laminate may possess a problem in that some of the fibre types are electrically conductive, e.g. carbon fibres and steel fibres. A lightning strike directly into the laminate may cause damage to a blade comprising electrically conductive fibres, as they would conduct the current and thereby i.a. be greatly heated. This is particularly problematic in case of fibres having comparatively poor conductivity, such as carbon fibres, and in case of hybrid laminates with fibres in e.g. mat-shape, where the individual mat may e.g. have a small portion of electrically conductive fibres and a larger portion of e.g. glass fibres that are not electrically conductive.

Further as the demands for blades for wind turbines tends towards blades of increasing lengths, attention is increasing on concepts of manufacturing blades in sections for being assembled at the installation site. Elements provided for allowing a secure and reliable connection between individual sections of the wind turbine blade bring about another challenge to protect the wind turbine blade from damages caused by lightning strikes. Such wind turbine blade, comprising a plurality of sections, may be known as a split blade, or two-part blade, or segmented blade or similar.

SUMMARY

It is an object of the present disclosure to provide ways for lightning protection of a wind turbine blade, such as a split/segmented blade, where the wind turbine blade is manufactured by manufacturing two (or more) blade sections and then joining them. In particular, it is an objective of the present disclosure to provide a spar beam, e.g. for connecting a first blade section and a second blade section, adapted for lightning protection, e.g. for protecting the wind turbine blade against lightning strikes, e.g. in a more advantageous way.

The present disclosure provides ways of improving lightning protection of a wind turbine blade, in particular being a split/segmented blade. The disclosure advantageously provides ways of combining different lightning protection concepts, facilitating decreased risk of damaging lightning strikes, and reducing material costs and production costs.

Accordingly, a spar beam is disclosed, such as a spar beam for connecting, such as structurally connecting, a first blade section and a second blade section of a wind turbine blade. The wind turbine blade may extend along a longitudinal axis from a root through a first airfoil region and a second airfoil region to a tip. The first blade section may extend along the longitudinal axis to a first end and the second blade section may extend along the longitudinal axis from a second end towards the tip. The first blade section may extend from the root. The second blade section may extend to the tip. The first blade section may comprise a root region, optionally including the root. The first blade section may comprise the first airfoil region. The first blade section may comprise a transition region between the root region and the first airfoil region. The second blade section may comprise the second airfoil region. The second airfoil region may comprise the tip. The first blade section and the second blade section may comprise a pressure side, a suction side and a chord line extending between a leading edge and a trailing edge.

The spar beam longitudinally extends along a spar beam axis from a first beam axis position, e.g. a first beam end, to a second beam axis position, e.g. a second beam end. The spar beam axis may be substantially parallel to the longitudinal axis of the wind turbine blade.

The spar beam is configured to be positioned such that the first beam axis position is located in the first airfoil region and the second beam axis position is located in the second airfoil region. The spar beam is configured to be positioned such that a third beam axis position, between the first beam axis position and the second beam axis position, is aligned with the second end of the second blade section and/or the first end of the first blade section.

The spar beam has a first beam side configured to face the pressure side or suction side of the wind turbine blade. The spar beam has a trailing edge beam side configured to face the trailing edge of the wind turbine blade. The spar beam has a leading edge beam side configured to face the leading edge of the wind turbine blade.

The spar beam comprises a conductive beam sheath. The conductive beam sheath circumscribes at least a beam sheath angular distance about the spar beam axis. The conductive beam sheath may longitudinally extend, e.g. along the spar beam axis, from a fourth beam axis position to a fifth beam axis position. The conductive beam sheath may be a conductive beam sheath for a lightning protection system of a wind turbine blade.

The spar beam may comprise a first fibre reinforced element, which may include electrically conductive fibres, such as carbon fibres. The first fibre reinforced element may extend parallel to the spar beam axis. The first fibre reinforced element may be positioned between the conductive beam sheath and the spar beam axis. For example, so that the spar beam, e.g. the fibre reinforced element of the spar beam, is protected from an electric current of a lightning strike by the conductive beam sheath.

The first fibre reinforced element may be pultruded, e.g. the first fibre reinforced element may be a first pultruded fibre reinforced element.

The spar beam and/or the first fibre reinforced element may be configured for structurally connecting the first blade section and the second blade section of the wind turbine blade. For example, so as to be able to transmit loads between the first blade section and second blade section.

The conductive beam sheath may be configured for receiving and transmitting an electric current from a lightning strike on the wind turbine blade, and thereby may protect the spar beam from a lightning strike on the wind turbine blade.

An outer surface of the spar beam may be configured for being attached to an inner surface, optionally an inner shell surface, of the first and/or second blade section of the wind turbine blade.

The spar beam may be separately provided or separately manufactured from blade sections and/or the wind turbine blade.

The fourth beam axis position may be between the first beam axis position and the second beam axis position. The fifth beam axis position may be between the first beam axis position and the second beam axis position. The fourth beam axis position may be the first beam axis position. The fifth beam axis position may be the second beam axis position.

Also disclosed is a wind turbine blade extending along a longitudinal axis from a root through a first airfoil region and a second airfoil region to a tip, the wind turbine blade comprising a first blade section extending along the longitudinal axis to a first end and a second blade section extending along the longitudinal axis from a second end towards the tip. The first blade section may extend from the root. The second blade section may extend to the tip. The first blade section may comprise a root region, optionally including the root. The first blade section may comprise the first airfoil region. The first blade section may comprise a transition region between the root region and the first airfoil region. The second blade section may comprise the second airfoil region. The second airfoil region may comprise the tip. The first blade section and the second blade section may comprise a pressure side, a suction side and a chord line extending between a leading edge and a trailing edge. The wind turbine blade may be a split blade, or two-part blade, or segmented blade. Each blade section may be a blade segment.

The wind turbine blade comprises a spar beam, such as the above disclosed spar beam, connecting, such as structurally connecting, the first blade section and the second blade section. The spar beam longitudinally extends along a spar beam axis from a first end of the spar beam at a first beam axis position, e.g. a first beam end, to a second end of the spar beam at a second beam axis position, e.g. a second beam end. The spar beam axis may be substantially parallel to the longitudinal axis of the wind turbine blade.

The spar beam is positioned such that the first beam axis position is located in the first airfoil region and the second beam axis position is located in the second airfoil region. The spar beam is positioned such that a third beam axis position, between the first beam axis position and the second beam axis position, is aligned with the second end of the second blade section and/or the first end of the first blade section.

The spar beam has a first beam side configured to face the pressure side or suction side of the wind turbine blade. The spar beam has a trailing edge beam side configured to face the trailing edge of the wind turbine blade. The spar beam has a leading edge beam side configured to face the leading edge of the wind turbine blade.

The spar beam comprises a conductive beam sheath. The conductive beam sheath circumscribes at least a beam sheath angular distance of the spar beam about the spar beam axis. The conductive beam sheath may longitudinally extend, e.g. along the spar beam axis from a fourth beam axis position to a fifth beam axis position.

The spar beam may comprise a first fibre reinforced element, which may include electrically conductive fibres, such as carbon fibres, and may extend parallel to the spar beam axis. The first fibre reinforced element may be positioned between the conductive beam sheath and the spar beam axis. The spar beam and/or the first fibre reinforced element may be structurally connecting the first and second blade sections.

It is noted that any feature described with respect to one aspect of the disclosure is applicable to any other aspect of the disclosure. For example, any disclosure relating to the spar beam is applicable to the spar beam of the disclosed wind turbine blade and vice versa.

The fifth beam axis position may be the second beam axis position. Alternatively, the fifth beam axis position may be between the fourth beam axis position and the second beam axis position.

The fourth beam axis position may be between the third beam axis position and the fifth beam axis position. The fourth beam axis position and the third beam axis position may be separated by a first distance. The first distance may be more than 10 mm, such as more than 20 mm, such as 30 mm.

The conductive beam sheath may be a mesh or partly a mesh, e.g. of electrically conductive material. The conductive beam sheath may be of an electrically conductive material, such as carbon fibre reinforced polymer or metals, such as copper, or alloy of metals.

The beam sheath angular distance may be more than 90 degrees, such as more than 180 degrees, such as more than 270 degrees, such as 360 degrees. For example, the conductive beam sheath may circumscribe the spar beam.

It is an advantage of the present disclosure, that lightning protection of a spar beam for connecting sections of a wind turbine blade may be provided. In particular, the present disclosure provides an advantageous lightning protection of a spar beam comprising electrically conductive elements, such as carbon fibre.

The spar beam may comprise a plurality of fibre reinforced elements, e.g. including the first fibre reinforced element and/or a second fibre reinforced element. The plurality of fibre reinforced elements may include electrically conductive fibres, such as carbon fibres.

The plurality of fibre reinforced elements may extend parallel to the spar beam axis. The plurality of fibre reinforced element may be positioned between the conductive beam sheath and the spar beam axis. For example, so that the spar beam, e.g. the fibre reinforced elements of the spar beam, is protected from an electric current of a lightning strike by the conductive beam sheath.

The plurality of fibre reinforced element may be configured for structurally connecting the first blade section and the second blade section of the wind turbine blade.

The plurality of fibre reinforced elements may be pultruded, e.g. the first fibre reinforced element may be a first pultruded fibre reinforced element and the second fibre reinforced element may be a second pultruded fibre reinforced element.

The spar beam may comprise carbon fibres, such as carbon fibre elements, e.g. with a fibre volume ratio of more than 40%, such as more than 50%, such as more than 60%. For example, the spar beam may comprise pultruded carbon-fibre reinforced elements. The pultruded fibre reinforced element(s), such as the first pultruded fibre reinforced element and/or the second pultruded fibre reinforced element may be pultruded carbon-fibre reinforced elements. The first pultruded fibre reinforced element may be a first pultruded carbon-fibre reinforced element. The second pultruded fibre reinforced element may be a second pultruded carbon-fibre reinforced element.

The spar beam may comprise carbon fibres between a fourteenth beam axis position and a fifteenth beam axis position. For example, the fibre reinforced element(s), such as the first fibre reinforced element and/or the second fibre reinforced element may comprise carbon fibres between the fourteenth beam axis position and the fifteenth beam axis position. Alternatively or additionally, the fibre reinforced element(s), such as the first fibre reinforced element and/or the second fibre reinforced element may extend between the fourteenth beam axis position and the fifteenth beam axis position.

The fourteenth beam axis position may be between the first beam axis position and the second beam axis position, such as between the first beam axis position and the third beam axis position. The fourteenth beam axis position may be the first beam axis position. The fifteenth beam axis position may be between the first beam axis position and the second beam axis position, such as between the second beam axis position and the third beam axis position, such as between the fifth beam axis position and the third beam axis position, such as between the fifth beam axis position and the fourth beam axis position. The fifteenth beam axis position may be between the second beam axis position and the fourteenth beam axis position, such as between the fifth beam axis position and the fourteenth beam axis position. The fifteenth beam axis position and the fifth beam axis position may be separated by a fourth distance. The fourth distance may be more than 10 mm, such as more than 20 mm, such as more than 30 mm, such as 50 mm.

The spar beam may comprise glass fibres between the fourteenth beam axis position and the first beam axis position. The spar beam may comprise glass fibres between the fifteenth beam axis position and the second beam axis position. For example, the spar beam may comprise pultruded fibre reinforced elements, such as pultruded glass fibre-reinforced elements, extending from the first beam axis position to the fourteenth beam axis position and/or from the second beam axis position to the fifteenth beam axis position. For example, the pultruded fibre reinforced element(s), such as the first pultruded fibre reinforced element and/or the second pultruded fibre reinforced element may comprise glass fibres between the first beam axis position and the fourteenth beam axis position and/or between the second beam axis position and the fifteenth beam axis position.

The cross section of the spar beam may be rectangular. Alternatively, the cross section of the spar beam may be circular, oval or have a combination of straight and curved sides.

The spar beam may comprise a first fibre reinforced layer. The first fibre reinforced layer may be between the first fibre reinforced element and the conductive beam sheath. The first fibre reinforced layer may be between the second fibre reinforced element and the conductive beam sheath. The first fibre reinforced layer may be between the plurality of fibre reinforced elements and the conductive beam sheath.

The spar beam may comprise a second fibre reinforced layer. The conductive beam sheath may be positioned between the second fibre reinforced layer and the spar beam axis. For example, the conductive beam sheath may be positioned between the second fibre reinforced layer and the first fibre reinforced layer.

The first fibre reinforced layer and/or the second fibre reinforced layer may be a biaxial fibre reinforced layer and/or may comprise one or more biaxial fibre sheets, such as a plurality, such as two, biaxial fibre sheets. The first fibre reinforced layer and/or the second fibre reinforced layer may provide stability and strength to avoid or reduce stress in the conductive beam sheath and/or to avoid or reduce stress to be transferred to the conductive beam sheath. Thereby, risk of failures, such as cracks, in the conductive beam sheath may be reduced. The first fibre reinforced layer and/or the second fibre reinforced layer may comprise glass fibres, e.g. the first fibre reinforced layer and/or the second fibre reinforced layer may be a glass fibre reinforced layer, e.g. a biaxial glass fibre reinforced layer. The first fibre reinforced layer and/or the second fibre reinforced layer may have an electrical insulating purpose, e.g. the first fibre reinforced layer may provide an electrical insulating layer between fibre reinforced elements and the conductive beam sheath. The second fibre reinforced layer may provide for an enhanced interface for fastening, e.g. by gluing, to surrounding elements, such as shell parts of the wind turbine blade.

The conductive beam sheath may comprise a primary overlap, e.g. wherein a first primary beam sheath part and a second primary beam sheath part is overlapping. For example, the conductive beam sheath may be provided as a single sheath being wrapped around internal elements of the spar beam to form the conductive beam sheath. The primary overlap may be located at the first beam side. Alternatively, the primary overlap may be located at the second beam side.

Alternatively or additionally, the conductive beam sheath may comprise a secondary overlap, e.g. wherein a first secondary beam sheath part and a second secondary beam sheath part is overlapping. The secondary overlap may be located at the second beam side. Alternatively, the secondary overlap may be located at the first beam side. For example, the primary overlap may be located at the first beam side and the secondary overlap may be located at the second beam side.

The conductive beam sheath may be provided as a leading edge beam sheath part and a trailing edge beam sheath part. The leading edge beam sheath part may be located at the leading edge beam side. The trailing edge beam sheath part may be located at the trailing edge beam side.

The primary overlap and/or the secondary overlap may extend from an eighth beam axis position, e.g. the fourth beam axis position, to a ninth beam axis position, e.g. the fifth beam axis position. The primary overlap may extend a primary overlap angular distance about the beam axis, e.g. from a first primary overlap angular position to a second primary overlap angular position. The secondary overlap may extend a secondary overlap angular distance about the beam axis, e.g. from a first secondary overlap angular position to a second secondary overlap angular position.

The primary overlap and/or the secondary overlap may be at least 50 mm in a transverse direction perpendicular to the spar beam axis, such as at least 75 mm, such as at least 100 mm.

The spar beam may comprise one or more conductive beam cables, such as a first conductive beam cable, a second conducive beam cable, and/or one or more third conductive beam cable. For example, the spar beam may comprise a plurality of conductive beam cables, e.g. including the first conductive beam cable, the second conductive beam cable and/or the one or more third conductive beam cables.

The first conductive beam cable may circumscribe at least a first beam cable angular distance of the spar beam about the spar beam axis, e.g. from a first primary beam cable angular position to a first secondary beam cable angular position.

The second conductive beam cable may circumscribe at least a second beam cable angular distance of the spar beam about the spar beam axis, e.g. from a second primary beam cable angular position to a second secondary beam cable angular position.

The one or more third conductive beam cables may extend in parallel with the beam axis B. Longitudinally extending beam cables may be easier to wrap around the spar beam leading to easier manufacturing. The one or more third conductive beam cables may extend from a twelfth beam axis position to a thirteenth beam axis position. The one or more third conductive beam cables may be positioned on one or more of the trailing edge beam side, the leading edge beam side, the first beam side and/or the second beam side.

The one or more conductive beam cables, such as the first conductive beam cable, the second conductive beam cable and/or the one or more third conductive beam cables, may be connected to the conductive beam sheath. For example, the one or more conductive beam cables may be in contact with the beam sheath and/or the one or more conductive beam cables may be soldered to the beam sheath. The one or more conductive beam cables may be soldered to the beam sheath at one or more sections along the respective one or more conductive beam cables and/or the one or more conductive beam cables may be non-soldered to the beam sheath at one or more other sections along the respective one or more conductive beam cables.

The one or more conductive beam cables, such as the first conductive beam cable, the second conductive beam cable and/or the one or more third conductive beam cables, may be braided cables.

The one or more conductive beam cables may provide electrical connection from one side of the beam sheath to another side of the beam sheath. For example, the one or more conductive beam cables may provide electrical connection from the leading edge beam side to the trailing edge beam side. The one or more conductive beam cables may provide a less resistive path from one side of the beam sheath to another side of the beam sheath, such as to reduce the dependency of the conductance of the conductive beam sheath to direct current caused by a potential lightning strike to the down conductor. For example, the one or more conductive beam cables may provide a less resistive path from the leading edge beam side to the trailing edge beam side.

The conductive beam sheath may be positioned between the one or more conductive beam cables and the spar beam axis. The conductive beam sheath may be positioned between the first conductive beam cable and the spar beam axis. For example, the one or more conductive beam cables may be provided radially outside of the conductive beam sheath. The one or more conductive beam cables may be positioned between the second fibre reinforced layer and the conductive beam sheath.

The first beam cable angular distance may be more than 360 degrees, e.g. providing a first beam cable overlap. The second beam cable angular distance may be more than 360 degrees, e.g. providing a second beam cable overlap. The first beam cable overlap and/or the second beam cable overlap may be more than 50 mm, such as more than 75 mm, such as more than 100 mm.

The first beam cable overlap may comprise that a first primary end part of the first conductive beam cable is contacting a first secondary end part opposite the first primary end part of the first conductive beam cable. Alternatively, the first primary end part may be arranged next to the first secondary end part, e.g. in the longitudinal direction of the spar beam.

The second beam cable overlap may comprise that a second primary end part of the second conductive beam cable is contacting a second secondary end part opposite the second primary end part of the second conductive beam cable. Alternatively, the second primary end part may be arranged next to the second secondary end part, e.g. in the longitudinal direction of the spar beam.

The beam cable overlap(s), such as the first beam cable overlap and/or the second beam cable overlap may be provided at the trailing edge beam side. The primary beam cable angular positions, such as the first primary beam cable angular position and/or the second primary beam cable angular position, may be located at the trailing edge beam side. The secondary beam cable angular positions, such as the first secondary beam cable angular position and/or the second secondary beam cable angular position, may be located at the trailing edge beam side.

The wind turbine blade, such as the first blade section of the wind turbine blade, may comprise conductive shell sheath(s), e.g. including a first conductive shell sheath and/or a second conductive shell sheath. Conductive shell sheath(s) may complement the beam sheath of the spar beam and/or be provided to replace the beam sheath at certain positions along the longitudinal direction of the wind turbine blade.

A first shell part of the first blade section may comprise a first conductive shell sheath. The first conductive shell sheath may circumscribe at least a first sheath angular distance about the longitudinal axis from a first primary sheath angular position to a first secondary sheath angular position. The first conductive shell sheath may longitudinally extend from a first sheath position to a second sheath position.

A second shell part of the first blade section may comprise a second conductive shell sheath. The second conductive shell sheath may circumscribe at least a second sheath angular distance about the longitudinal axis from a second primary sheath angular position to a second secondary sheath angular position. The second conductive shell sheath may longitudinally extend from a third sheath position, e.g. the first sheath position, to a fourth sheath position, e.g. the second sheath position.

The shell of the wind turbine blade may comprise one or more spar caps, such as a first spar cap and/or a second spar cap. For example, the first shell part may comprise a first spar cap. The first spar cap may be on the pressure side.

Alternatively, the first first spar cap on the suction side. The second shell part may comprise a second spar cap. The second spar cap may be on the suction side. Alternatively, the second spar cap may be on the pressure side. A spar cap, such as the first spar cap and/or the second spar cap may be a fibre-reinforced principal laminate. A spar cap, such as the first spar cap and/or the second spar cap may comprise electrically conductive fibres, such as carbon fibres. A spar cap, such as the first spar cap and/or the second spar cap may be denoted main laminate and/or load carrying laminate.

The first conductive shell sheath may be positioned such that the first spar cap is located between the first primary sheath angular position and the first secondary sheath angular position. The second conductive shell sheath may be positioned such that the second spar cap is located between the second primary sheath angular position and the second secondary sheath angular position.

The first conductive shell sheath and/or the second conductive shell sheath may be a mesh of electrically conductive material. The first conductive shell sheath and/or the second conductive shell sheath may be of an electrically conductive material, such as carbon fibre reinforced polymer or metals, such as copper, or alloy of metals.

The wind turbine blade may comprise one or more down conductors, e.g. including a first down conductor and/or a second down conductor. The first blade section may comprise a first down conductor. The first down conductor may be configured for conducting lightning current to ground. The second blade section may comprise a second down conductor. The second down conductor may be configured for conducting lightning current to ground, e.g. via the first down conductor. The second down conductor may be configured for being connected to the first down conductor of the first blade section. The second down conductor may be connected to the first down conductor of the first blade section.

The first down conductor may be electrically connected to the first conductive shell sheath and/or the second conductive shell sheath. The second down conductor may be electrically connected to the conductive beam sheath. The second down conductor may be electrically connected to the conductive beam sheath at one or more, such as a plurality, of beam axis positions, e.g. a first attachment position, such as a sixth beam axis position and/or a second attachment position, such as a seventh beam axis position.

The conductive beam sheath may be configured for connection with a down conductor configured for conducting lightning current to ground. For example, the spar beam may comprise one or more attachment positions, such as a first attachment position and/or a second attachment position, e.g. wherein the conductive beam sheath may be configured for connection with a down conductor configured for conducting lightning current to ground. The first attachment position may be the sixth beam axis position. The second attachment position may be the seventh beam axis position. The attachment positions, such as the first attachment position and/or the second attachment position, may be located at the trailing edge beam side.

The beam cable overlap(s), such as the first beam cable overlap and/or the second beam cable overlap may be provided at the one or more attachment positions. For example, the first beam cable overlap may be provided at the first attachment position, and/or the second beam cable overlap may be provided at the second attachment position.

The conductive beam cable(s), may be partitioned into a primary conductive beam cable and a secondary conductive beam cable. The first conductive beam cable may comprise a first primary conductive beam cable and a first secondary conductive beam cable. The second conductive beam cable may comprise a second primary conductive beam cable and a second secondary conductive beam cable.

The first primary conductive beam cable may circumscribe a first primary beam cable angular distance about the spar beam axis B, e.g. from the first primary beam cable angular position to a first tertiary beam cable angular position. The second primary conductive beam cable may circumscribe a second primary beam cable angular distance about the spar beam axis B, e.g. from the second primary beam cable angular position to a second tertiary beam cable angular position.

The first secondary conductive beam cable may circumscribe a first secondary beam cable angular distance about the spar beam axis B, e.g. from the first secondary beam cable angular position to a first quaternary beam cable angular position. The second secondary conductive beam cable may circumscribe a second secondary beam cable angular distance about the spar beam axis B, e.g. from the second secondary beam cable angular position to a second quaternary beam cable angular position.

The first primary conductive beam cable may overlap the first secondary conductive beam cable, such as to form a first secondary beam cable overlap, and/or such as to form the first conductive beam cable. The second primary conductive beam cable may overlap the second secondary conductive beam cable, such as to form a second secondary beam cable overlap, and/or such as to form the first conductive beam cable. The secondary beam cable overlap(s) may be provided on the first beam side. Alternatively, the secondary beam cable overlap(s) may be provided on the second beam side.

The spar beam may comprise one or more attachment discs, such as a first attachment disc and/or a second attachment disc. The spar beam may comprise a first attachment disc at the first attachment position. The spar beam may comprise a second attachment disc at the second attachment position. The first attachment disc may be soldered to the conductive beam sheath and/or the first beam cable, such as the first beam cable overlap. The second attachment disc may be soldered to the conductive beam sheath and/or the second beam cable, such as the second beam cable overlap.

The first attachment disc may be provided on, such as to cover, the first primary end part and/or the first secondary end part of the first conductive beam cable. The second attachment disc may be provided on, such as to cover, the second primary end part and/or the second secondary end part of the second conductive beam cable.

The first attachment disc may be provided on, such as to cover, a third primary part of a third conductive beam cable of the one or more third conductive beam cables. The second attachment disc may be provided on, such as to cover, a third secondary part of the third conductive beam cable of the one or more third conductive beam cables.

Attachment discs, such as the first attachment disc and/or the second attachment disc, may provide attachment points for a down conductor, such as to electrically connect the down conductor with the conductive beam sheath and/or the conductive beam cable(s), such as the first conductive beam cable and/or the second conductive beam cable.

The second down conductor may be electrically connected to the conductive beam sheath, e.g. at a first attachment position, such as a sixth beam axis position. The first attachment position, such as the sixth beam axis position, may be between the fourth beam axis position and the fifth beam axis position. The first attachment position, such as the sixth beam axis position, and the fifth beam axis position may be separated by a second distance. The second distance may be less than 150 mm, such as less than 100 mm, such as less than 50 mm. The first attachment position, such as the sixth beam axis position may be chosen such as to provide the electrical connection between the second down conductor and the conductive beam sheath as close to the end of the conductive beam sheath. For example, the first attachment position, such as the sixth beam axis position, may be the fifth beam axis position.

The second down conductor may be electrically connected to the conductive beam sheath, e.g. at a second attachment position, such as a seventh beam axis position. The second attachment position, such as the seventh beam axis position, may be between the fourth beam axis position and the fifth beam axis position. The second attachment position, such as the seventh beam axis position, and the fourth beam axis position may be separated by a third distance. The third distance may be less than 150 mm, such as less than 100 mm, such as less than 50 mm. The second attachment position, such as the seventh beam axis position, may be chosen such as to provide the electrical connection between the second down conductor and the conductive beam sheath as close to the end of the conductive beam sheath. For example, the second attachment position, such as the seventh beam axis position, may be the fourth beam axis position.

The second blade section may comprise one or more lightning receptors, e.g. at or in proximity of the external surface of the wind turbine blade. The second blade section may comprise a first lightning receptor, e.g. at or in proximity of the external surface of the blade. The first lightning receptor may be positioned at or in proximity of the tip. The second down conductor may be electrically connected to the first lightning receptor.

The first blade section may comprise one or more lightning receptors, e.g. at or in proximity of the external surface of the wind turbine blade. The first blade section may comprise a first lightning receptor, e.g. at or in proximity of the external surface of the blade. The second lightning receptor may be positioned at or in proximity of the first end. The first down conductor may be electrically connected to the second lightning receptor.

Also disclosed is a method for structurally connecting a first blade section with a second blade section of a wind turbine blade, the method comprising:
  providing a spar beam according to the present disclosure and the first and second blade section of the wind turbine blade;
  positioning the spar beam such that the first beam axis position is located in the first airfoil region of the first blade section and the second beam axis position is located in the second airfoil region of the second blade section and the third beam axis position is aligned with the second end of the second blade section, and such that the first beam side is facing the pressure side or suction side of the wind turbine blade, the trailing edge beam side is facing the trailing edge of the wind turbine blade, and the leading edge beam side is facing the leading edge of the wind turbine blade; and
  structurally connecting the first blade section and the second blade section via the spar beam.

Further disclosed is the use of a spar beam of the present disclosure for structurally connecting a first blade section and a second blade section to form a wind turbine blade, wherein the wind turbine blade extends along a longitudinal axis from a root through a first airfoil region and a second airfoil region to a tip, wherein the first blade section extends along the longitudinal axis to a first end and the second blade section extends along the longitudinal axis from a second end towards the tip, the first blade section comprising the first airfoil region, the second blade section comprising the second airfoil region, the first blade section and the second blade section comprising a pressure side, a suction side and a chord line extending between a leading edge and a trailing edge.

Any of the mentioned beam axis positions, such as the third beam axis position, the fourth beam axis position, the fifth beam axis position, the sixth beam axis position, the seventh beam axis position, the eighth beam axis position, the ninth beam axis position, the tenth beam axis position, the eleventh beam axis position, the twelfth beam axis position, the thirteenth beam axis position, the fourteenth beam axis position and/or the fifteenth beam axis position, may be between the first beam end and the second beam end, such as between the first beam axis position and the second beam axis position.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
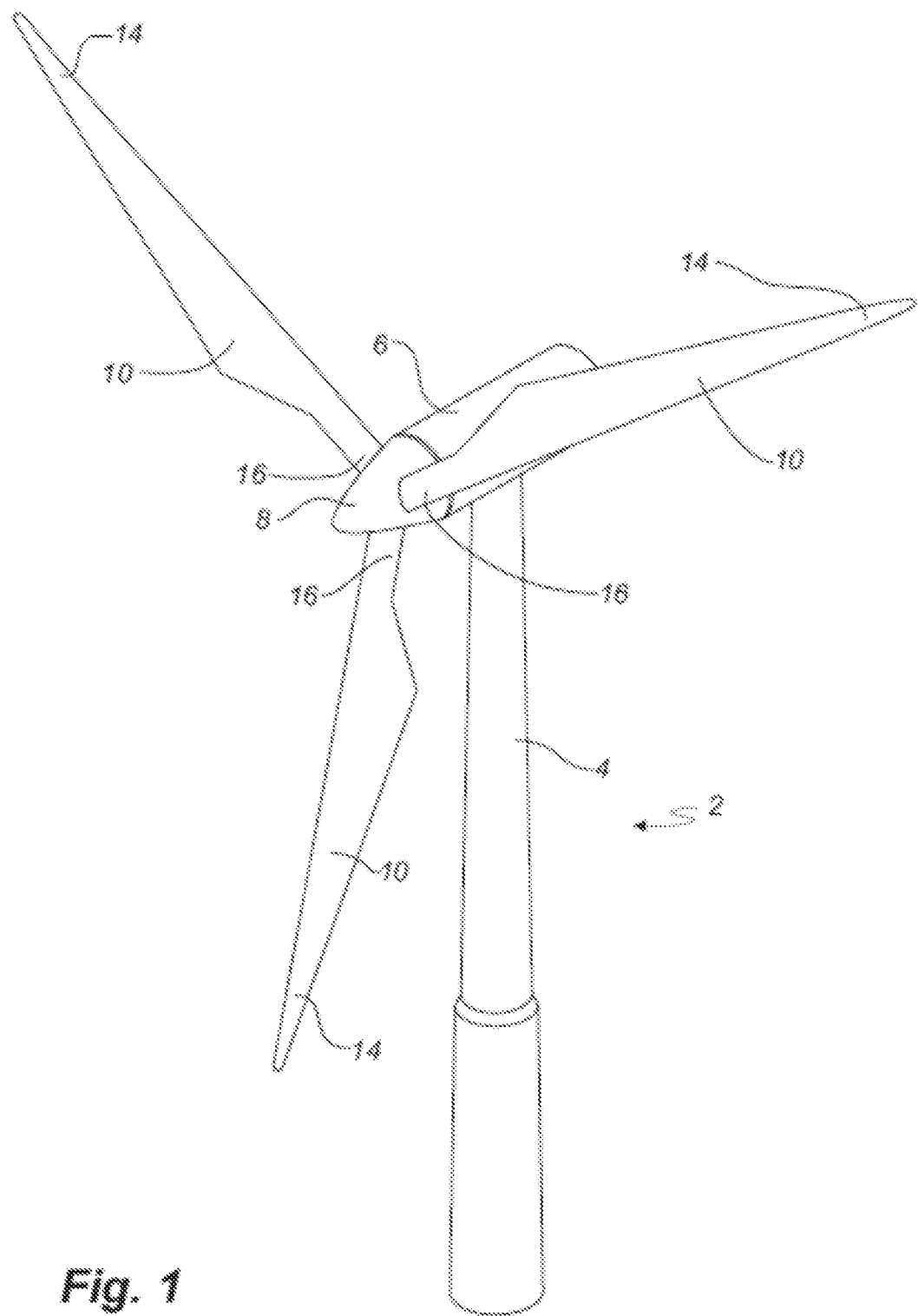
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
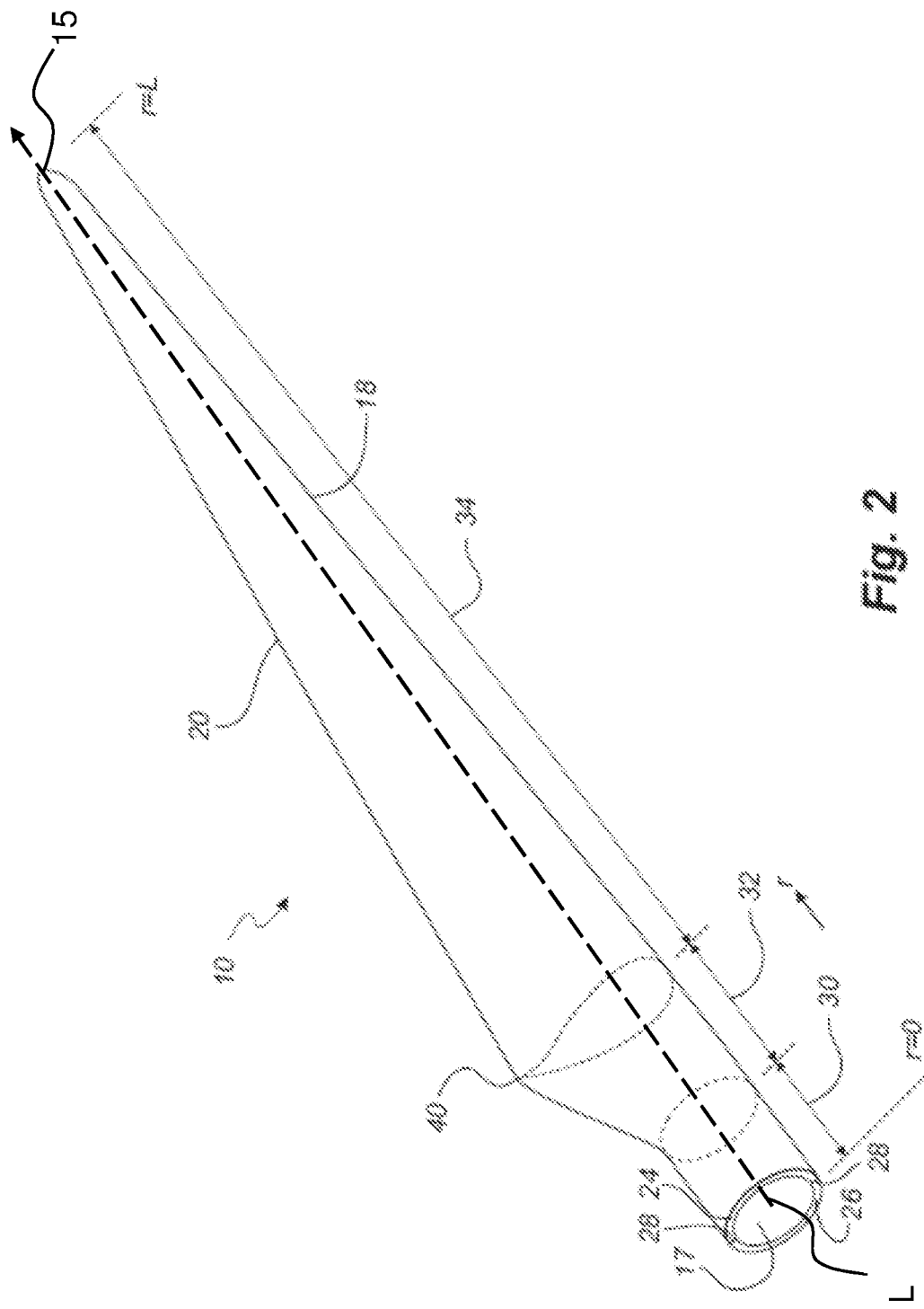
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 extends along a longitudinal axis L. The root end 17 extends in a root end plane, substantially perpendicular to the longitudinal axis L.

Figure 3:
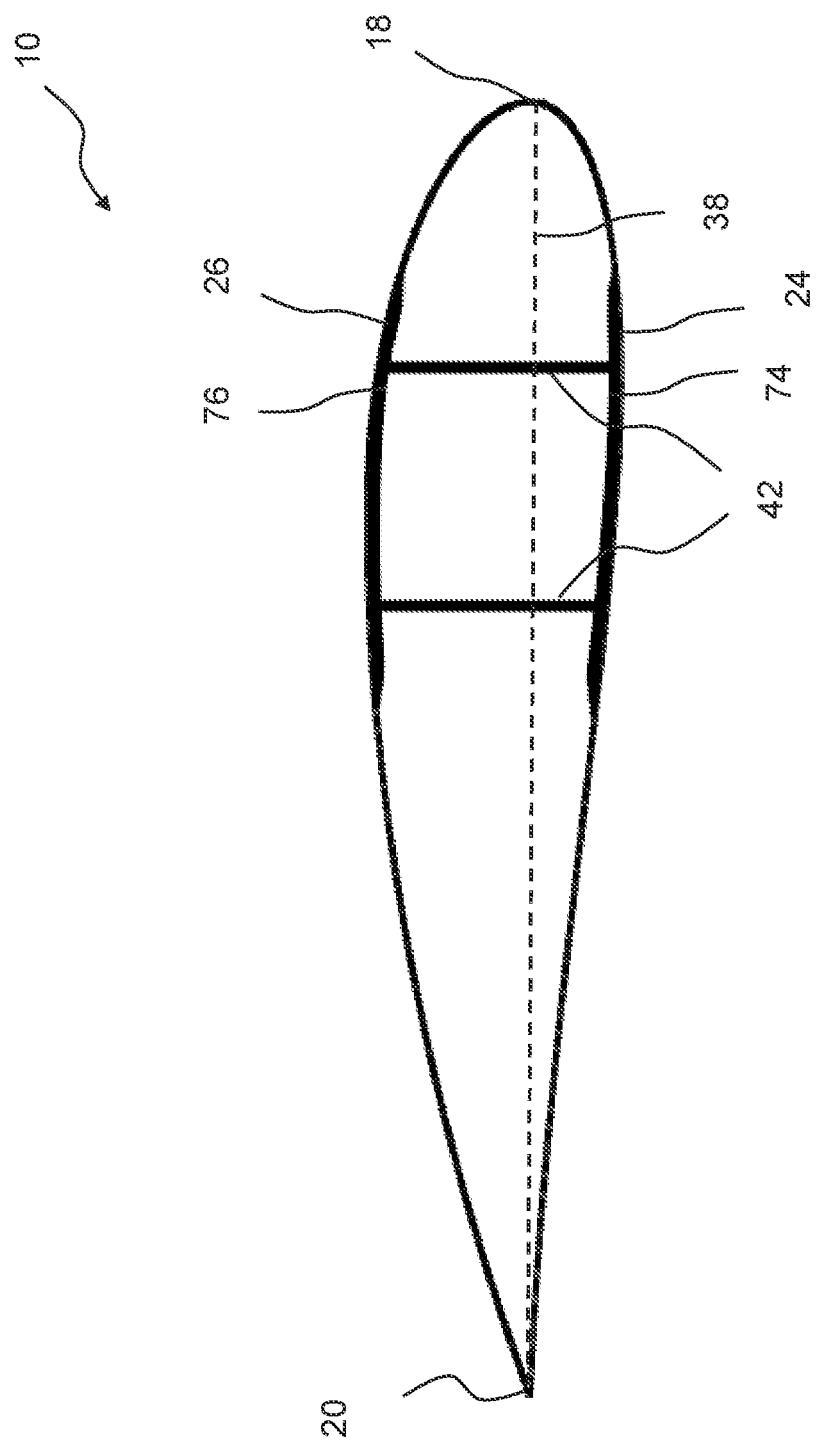
FIG. 3 is a schematic diagram illustrating a cross section of an exemplary wind turbine blade.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, a suction side 26 a first spar cap 74, and a second spar cap 76.

The wind turbine blade 10 comprises a chord line 38 between the leading edge 18 and the trailing edge 20.

The wind turbine blade 10 comprises shear webs 42, such as a leading edge shear web and a trailing edge shear web. The shear webs 42 could alternatively be a spar box with spar sides, such as a trailing edge spar side and a leading edge spar side.

Figure 4:
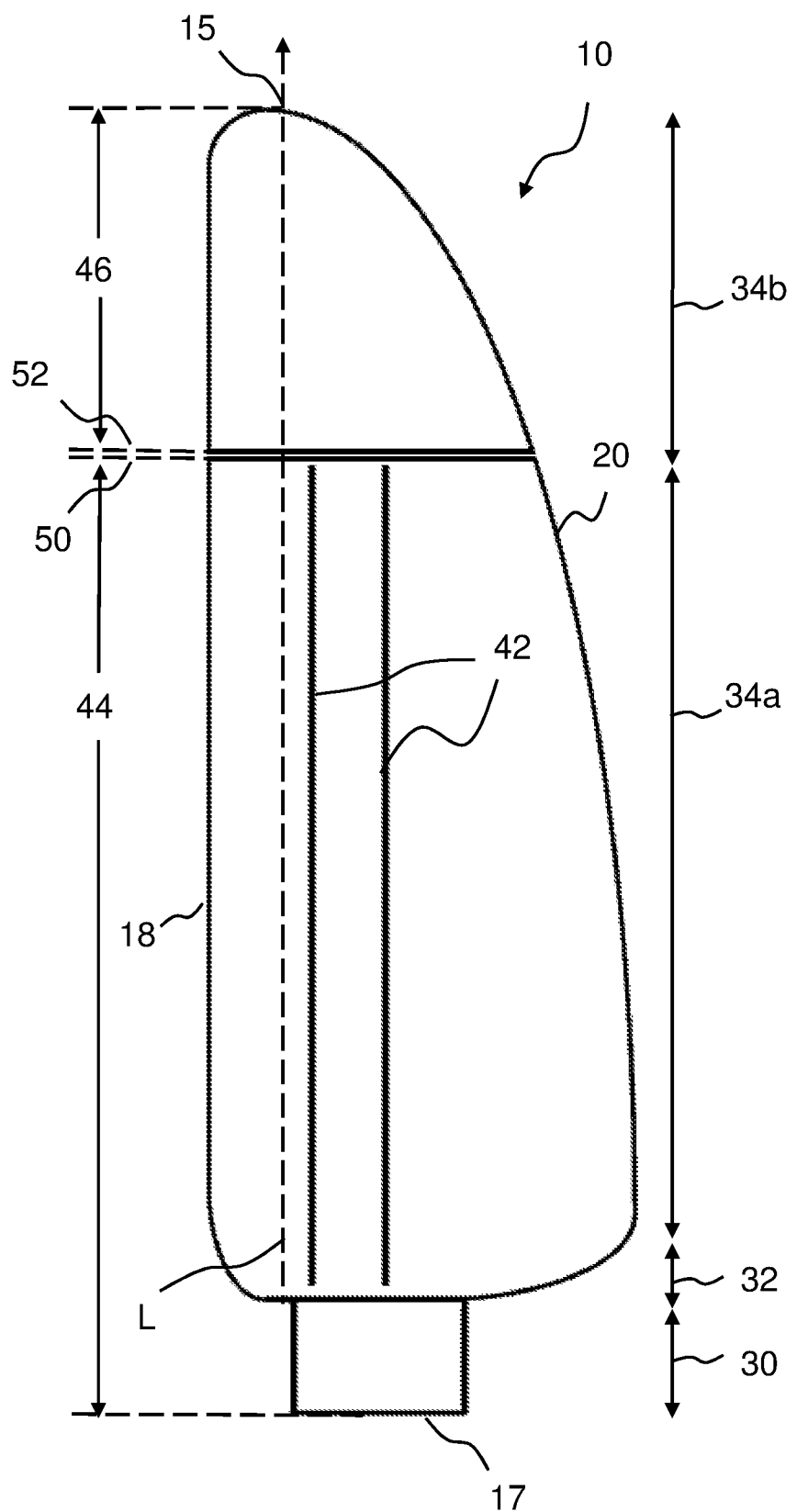
FIG. 4 is a schematic diagram illustrating an exemplary wind turbine blade.

FIG. 4 is a schematic diagram illustrating an exemplary wind turbine blade 10, such as the wind turbine blade 10 of the previous figures. The wind turbine blade 10 comprises a leading edge 18, a trailing edge 20, a tip end 15 and a root end 17. The wind turbine blade 10 comprises shear webs 42, such as a leading edge shear web and a trailing edge shear web.

The wind turbine blade 10 is a so-called split blade, or two-part blade, or segmented blade. The wind turbine blade 10 comprises a first blade section 44 and a second blade section 46. The first blade section 44 extends along the longitudinal axis L from a root, such as the root end 17, to a first end 50. The second blade section 46 extends along the longitudinal axis L from a second end 52 to a tip, such as the tip end 15. The first blade section comprises 44 a root region 30, a first airfoil region 34a and a transition region 32 between the root region 30 and the first airfoil region 34a. The second blade section 46 comprises a second airfoil region 34b with the tip, such as the tip end 15. The first blade section 44 and the second blade section 46 may be connected with a spar beam (see following figures).

Figure 5A:
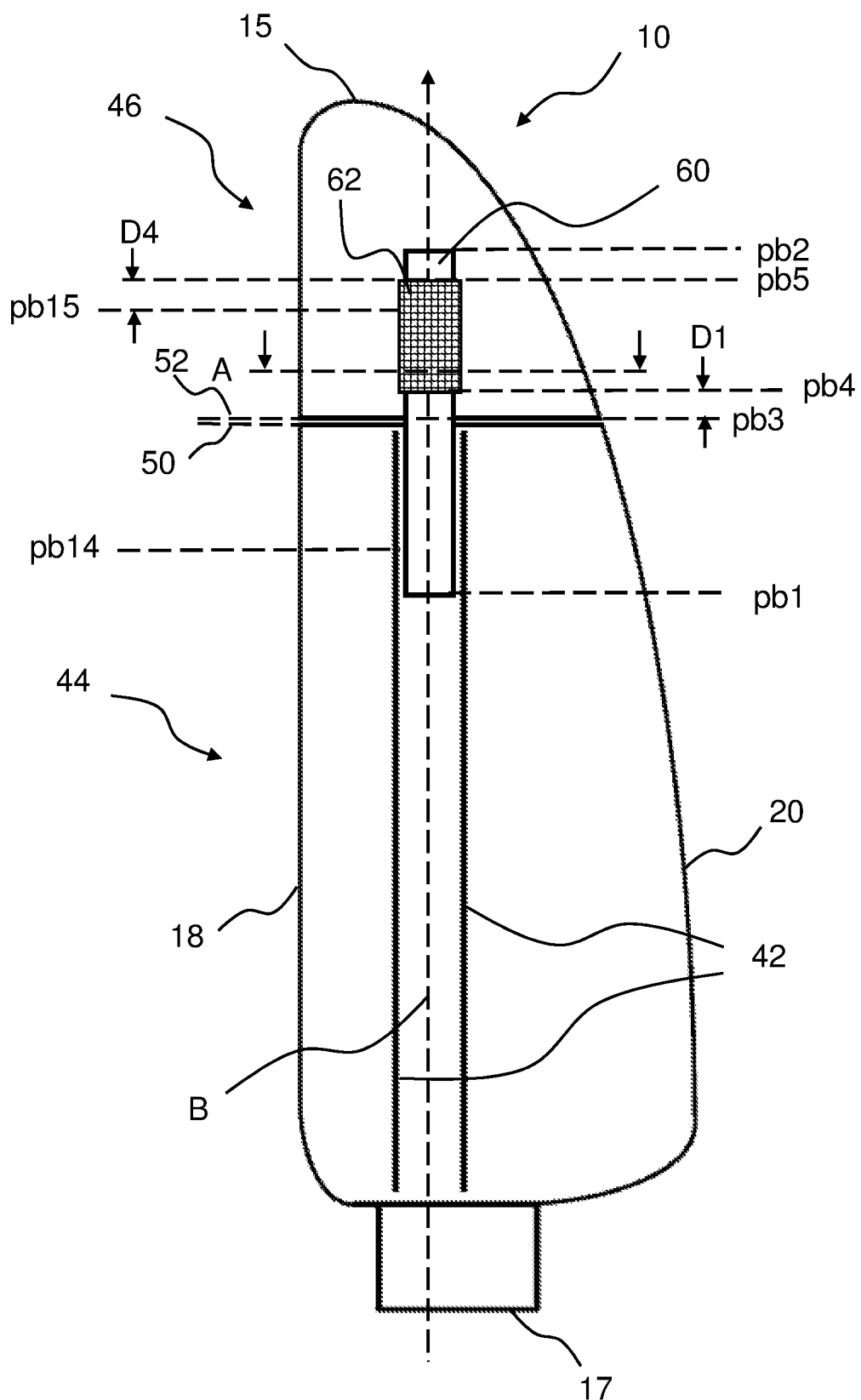
FIG. 5a is a schematic diagram illustrating an exemplary wind turbine blade.

FIG. 5a is a schematic diagram illustrating an exemplary wind turbine blade 10, such as the wind turbine blade 10 of the previous figures. The wind turbine blade 10 comprises first blade section 44, a second blade section 46, and a spar beam 60 for connecting the first blade section 44 and the second blade section 46. The spar beam 60 may comprise carbon fibre, e.g. the spar beam 60 may comprise pultruded carbon fibre reinforced polymer.

The spar beam 60 extends along a spar beam axis B. The spar beam axis B may be coinciding and/or parallel with the longitudinal axis of the wind turbine blade 10. The spar beam 60 extends from a first beam axis position pb1 in the first airfoil region 34a to a second beam axis position pb2 in the second airfoil region 34b.

A third beam axis position pb3 is between the first beam axis position pb1 and second beam axis position pb2. The third beam axis position pb3 is aligned with the second end 52 of the second blade section 46.

The spar beam 60 comprises a conductive beam sheath 62. The conductive beam sheath 62 circumscribes at least a beam sheath angular distance 68 (see, e.g. FIG. 5b) about the spar beam axis B. The conductive beam sheath longitudinally extends from a fourth beam axis position pb4 to a fifth beam axis position pb5. In the illustrated example, the fifth beam axis position pb5 is different from the second beam axis position pb2, e.g. the fifth beam axis position pb5 may be located between the fourth beam axis position pb4 and the second beam axis position pb2. However, alternatively, the fifth beam axis position pb5 may be the second beam axis position pb2. As illustrated, the fourth beam axis position may be between the fifth beam axis position pb5 and the third beam axis position pb3. For example, the fourth beam axis position pb4 and the third beam axis position pb3 may be separated by a first distance D1, e.g. the first distance may be more than 10 mm, such as more than 20 mm, such as 30 mm. Alternatively, the fourth beam axis position pb4 may be located between the third beam axis position pb3 and the first beam axis position pb1. The conductive beam sheath 62 may be a mesh or partly a mesh. The conductive beam sheath 62 may be of an electrically conductive material, such as carbon fibre reinforced polymer or metals, such as copper, or alloy of metals.

Also illustrated are a fourteenth beam axis position pb14 and a fifteenth beam axis position pb15. These positions may denote a part of the spar beam 60 comprising electrically conductive fibres, such as carbon fibres. For example, the spar beam 60 may comprise carbon fibres between the fourteenth beam axis position pb14 and a fifteenth beam axis position pb15. For example, the spar beam may comprise pultruded fibre reinforced elements 110, 112 (see e.g. FIG. 7a-c) comprising carbon fibres between the fourteenth beam axis position pb14 and the fifteenth beam axis position pb15. Alternatively or additionally, the pultruded fibre reinforced element 110, 112, e.g. being pultruded carbon fibre reinforced elements may extend between the fourteenth beam axis position pb14 and the fifteenth beam axis position pb15.

The fifteenth beam axis position pb15 is between the fifth beam axis position pb5 and the fourth beam axis position pb4. The fifteenth beam axis position pb15 and the fifth beam axis position pb5 is separated by a fourth distance D4. The fourth distance D4 may be more than 10 mm, such as more than 20 mm, such as more than 30 mm, such as 50 mm. By terminating the content of conductive fibres prior to the end of the conductive beam sheath 62, lightning protection of the spar beam 60 may be enhanced.

Figure 5B:
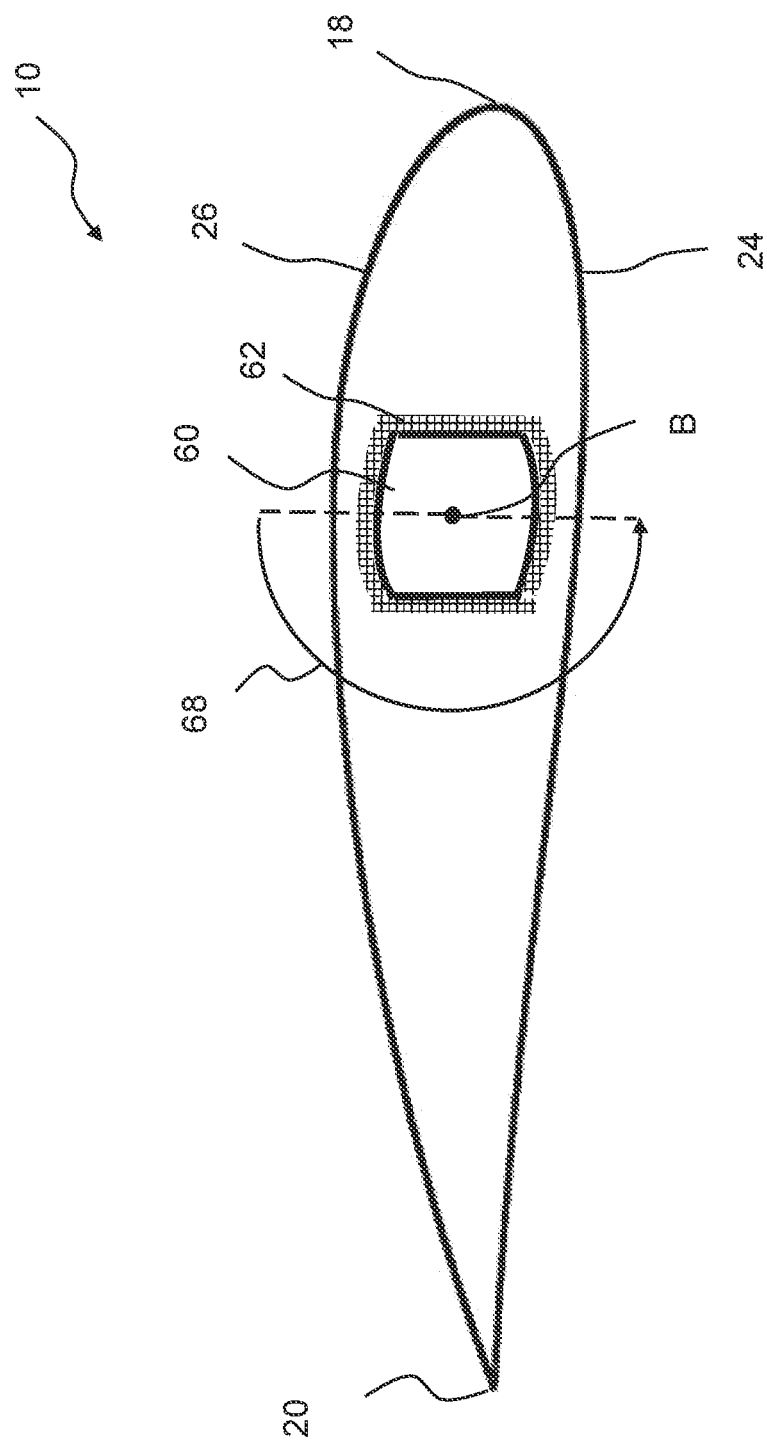
FIG. 5b is a schematic diagram illustrating a cross section of an exemplary wind turbine blade.

FIG. 5b is a schematic diagram illustrating a cross sectional view of an exemplary wind turbine blade 10, e.g. a cross sectional view of the airfoil region, such as the second airfoil region, of the wind turbine blade 10, such as the wind turbine blade 10 of FIG. 5a seen from the line A as indicated in FIG. 5a.

The wind turbine blade 10 comprises a spar beam 60. The spar beam 60 comprises a conductive beam sheath 62 circumscribing at least a beam sheath angular distance 68 about the spar beam axis B. The beam sheath angular distance 68 is more than 90 degrees, such as more than 180 degrees, such as more than 270 degrees, such as 360 degrees. For example, the beam sheath 62 may circumscribe the entire spar beam axis B, e.g. the beam sheath angular distance 68 may be 360 degrees, such as illustrated. The cross section of the spar beam 60 is substantially rectangular. However, alternatively the cross section of the spar beam 60 may be circular or oval.

Figure 6A:
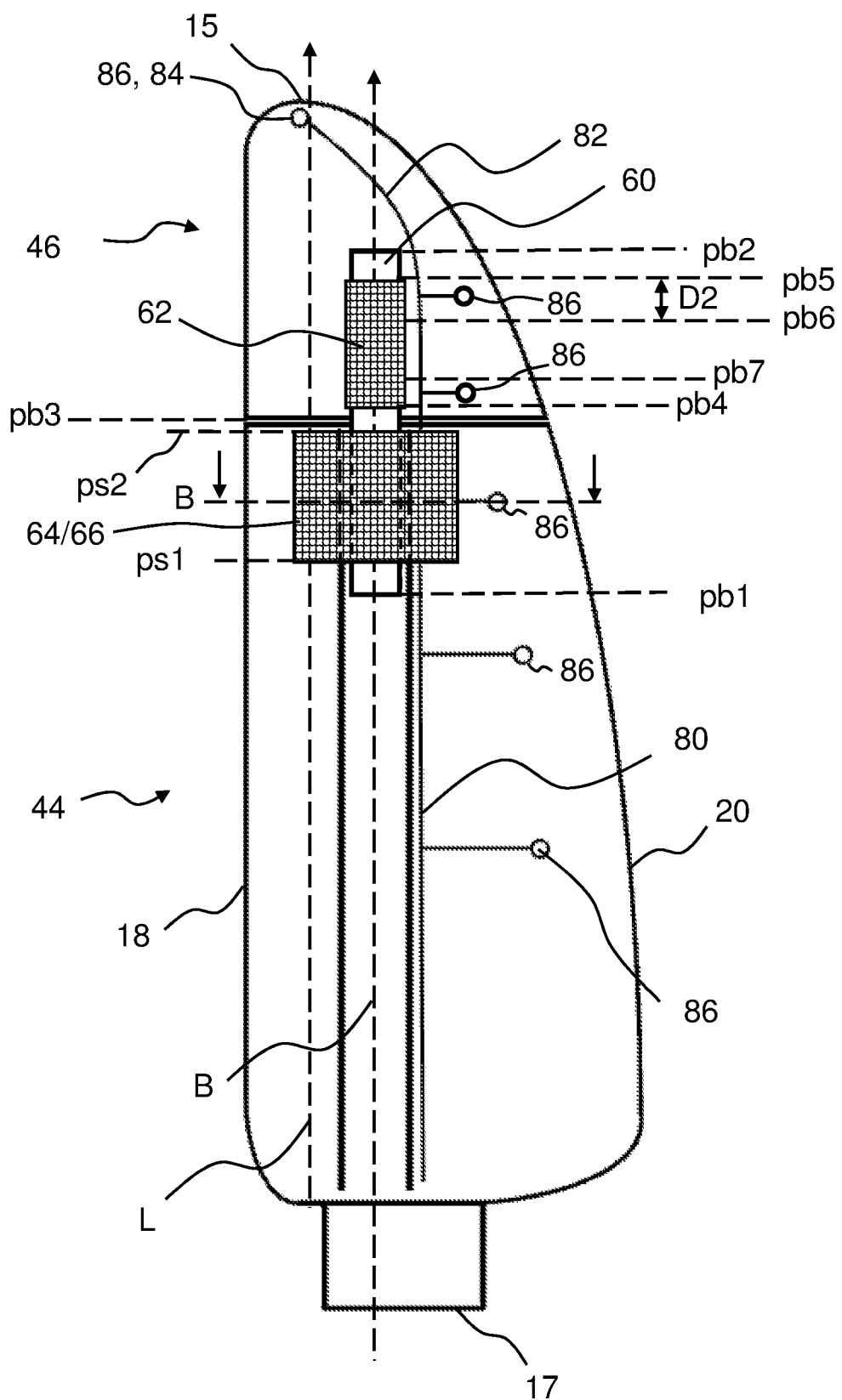
FIG. 6a is a schematic diagram illustrating an exemplary wind turbine blade.

FIG. 6a is a schematic diagram illustrating an exemplary wind turbine blade 10, such as the wind turbine blade 10 of the previous figures. The wind turbine blade 10 comprises a first blade section 44 and a second blade section 46, shear webs 42 and a spar beam 60 with a beam sheath 62. The wind turbine blade comprises a first conductive shell sheath 64 and/or a second conductive shell sheath 66 longitudinally extending from a first sheath position ps1 to a second sheath position ps2. Although not specifically illustrated, the wind turbine blade 10 may comprise a plurality of conductive shell sheaths along the length of the wind turbine blade 10.

The first blade section 44 comprises a first down conductor 80 configured for conducting lightning current to ground. The first down conductor 80 is electrically connected to the first conductive shell sheath 64 and/or the second conductive shell sheath 66. The second blade section 46 comprises a second down conductor 82. The second down conductor 82 is configured for being connected to the first down conductor 80 of the first blade section 44.

The second down conductor 82 is electrically connected to the conductive beam sheath 62 at a sixth beam axis position pb6. The sixth beam axis position pb6 is between the fourth beam axis position pb4 and the fifth beam axis position pb5. The sixth beam axis position pb6 and the fifth beam axis position pb5 is separated by a second distance D2. The second distance D2 may be less than 150 mm, such as less than 100 mm, such as less than 50 mm. In an alternative exemplary wind turbine blade, the sixth beam axis position pb6 may be the fifth beam axis position pb5. For example, the second distance D2 may be 0 mm. The second down conductor 82 may be electrically connected to the conductive beam sheath at a plurality of beam axis positions, e.g. including the sixth beam axis position pb6 and a seventh beam axis position pb7.

The wind turbine blade 10 comprises a plurality of lightning receptors 86 at or in proximity of the external surface of the wind turbine blade 10. The plurality of lightning receptors 86 are electrically connected to the first down conductor 80 and/or the second down conductor 82. The second blade section 46 comprises a first lightning receptor 84. The first lightning receptor 84 is positioned at or in proximity of the tip end 15. The second down conductor 82 is electrically connected to the first lightning receptor 84.

Figure 6B:
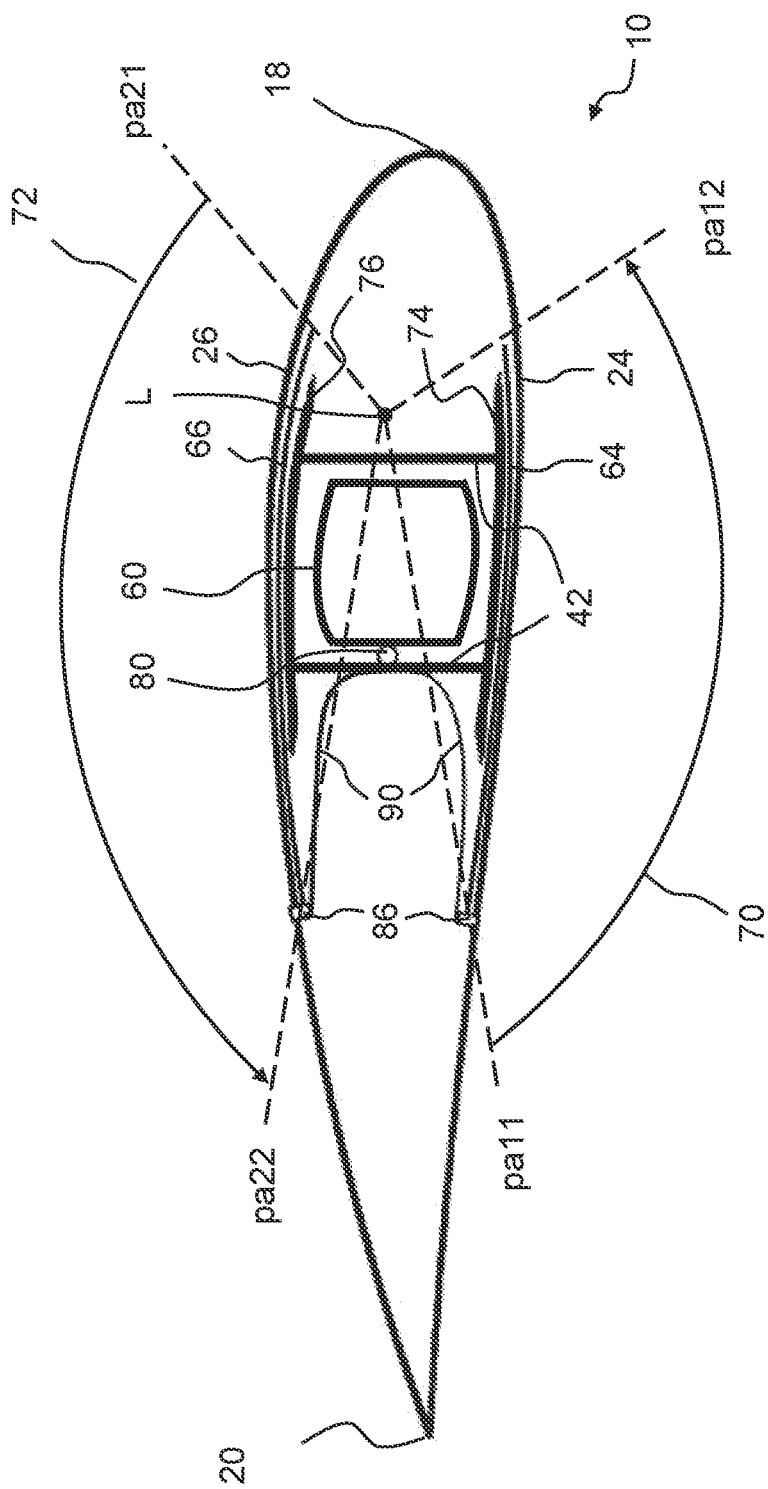
FIG. 6b is a schematic diagram illustrating a cross section of an exemplary wind turbine blade.

FIG. 6b is a schematic diagram illustrating a cross sectional view of an exemplary wind turbine blade 10, such as the wind turbine blade 10 of FIG. 6a seen from the line B as indicated in FIG. 6a. The wind turbine blade 10 comprises a leading edge 18, a trailing edge 20, shear webs 42 and a spar beam 60. The wind turbine blade 10 comprises a first shell part, e.g. a pressure side 24 and a second shell part, e.g. the suction side 26.

The first shell part 24 comprises a first conductive shell sheath 64 circumscribing at least a first sheath angular distance 70 about the longitudinal axis L from a first primary sheath angular position pa11 to a first secondary sheath angular position pa12. The first conductive shell sheath 64 may longitudinally extend from a first sheath position ps1. (see FIG. 6a) to a second sheath position ps2 (see FIG. 6a). The first shell part 24 comprises a first spar cap 74. The first conductive shell sheath 64 is positioned such that the first spar cap 74 is located between the first primary sheath angular position pa11 and the first secondary sheath angular position pa12.

The second shell part 26 comprises a second conductive shell sheath 66 circumscribing at least a second sheath angular distance 72 about the longitudinal axis L from a second primary sheath angular position pa21 to a second secondary sheath angular position pa22. The second conductive shell sheath 66 may longitudinally extend from a first sheath position ps1 (see FIG. 6a) to a second sheath position ps2 (see FIG. 6a). The second shell part 26 comprises a second spar cap 76. The second conductive shell sheath 66 is positioned such that the second spar cap is located between the second primary sheath angular position pa21 and the second secondary sheath angular position pa22.

The first conductive shell sheath 64 and/or the second conductive shell sheath 66 may be a mesh or partly a mesh. The first conductive shell sheath 64 and/or the second conductive shell sheath 66 may be of an electrically conductive material, such as carbon fibre reinforced polymer or metals, such as copper, or alloy of metals.

For illustrative purposes, the spar caps 74, 76 and the conductive shell sheaths 64, 66 are shown separately from the shells 24, 26 of the wind turbine blade 10. However, the spar caps 74, 76 and/or the conductive shell sheaths 64, 66 may be integral parts of the shell parts 24, 26.

A first down conductor 80, runs in a longitudinal direction of the blade 10 along the shear web 42, e.g. along the trailing edge shear web. The first down conductor 80 may alternatively run along the leading edge shear web. The first down conductor 80 is electrically connected to a plurality of lightning receptors 86. The lightning receptors 86 may be supported by a receptor bracket 90. The receptor bracket 90 may be of an electrically conductive material, such as carbon fibre reinforced polymer or metal. Alternatively, the receptor bracket 90 may be of a non-electrically-conductive material, in which case, the receptors 86 may be electrically connected to the first down conductor 80 with cables or other conductive means. The lightning receptors 86 may be located at or in the proximity of the external surface of the wind turbine blade 10.

Figure 7A:
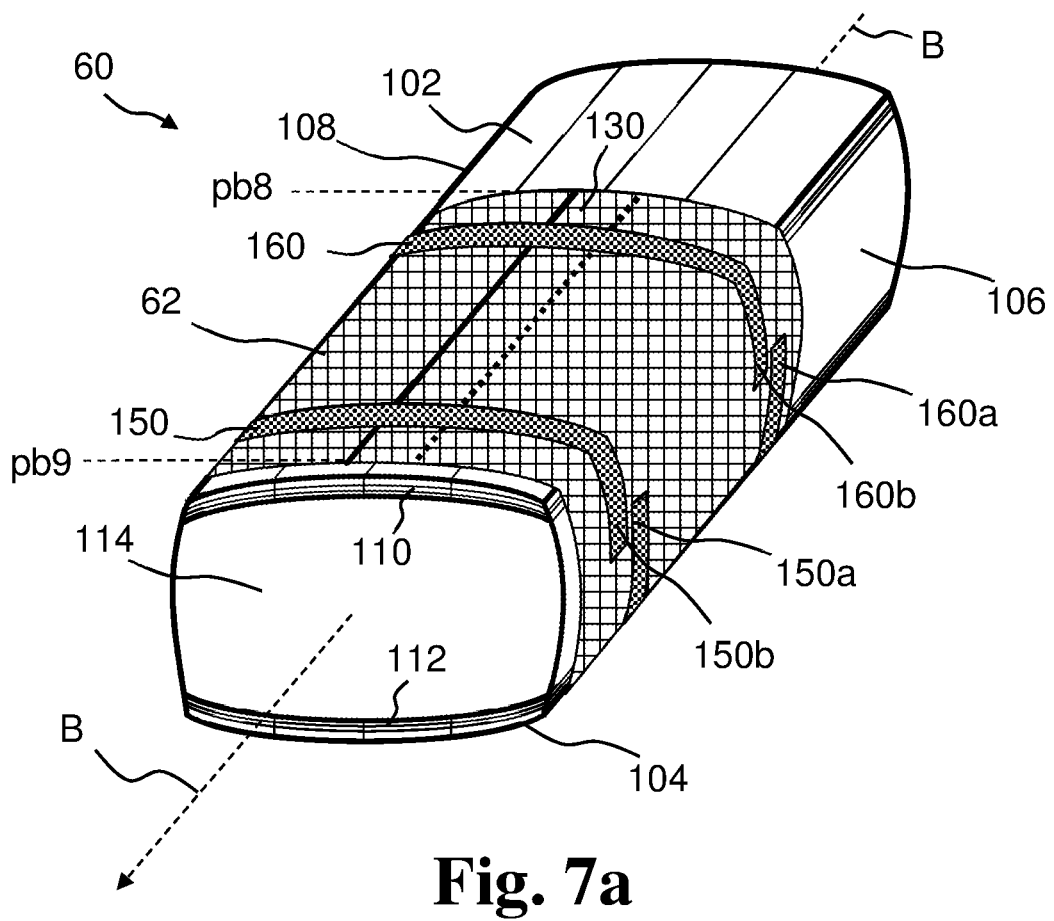
FIG. 7a-7c are schematic diagrams illustrating an exemplary spar beam.

FIG. 7a is a schematic diagram illustrating an exemplary spar beam 60, such as the spar beam 60 as illustrated in the previous figures. The spar beam 60 longitudinally extends along a spar beam axis B and is configured to connect a first blade section and a second blade section of a wind turbine blade, e.g. as illustrated in relation to the previous figures (see e.g. FIG. 5a).

Figure 7B:
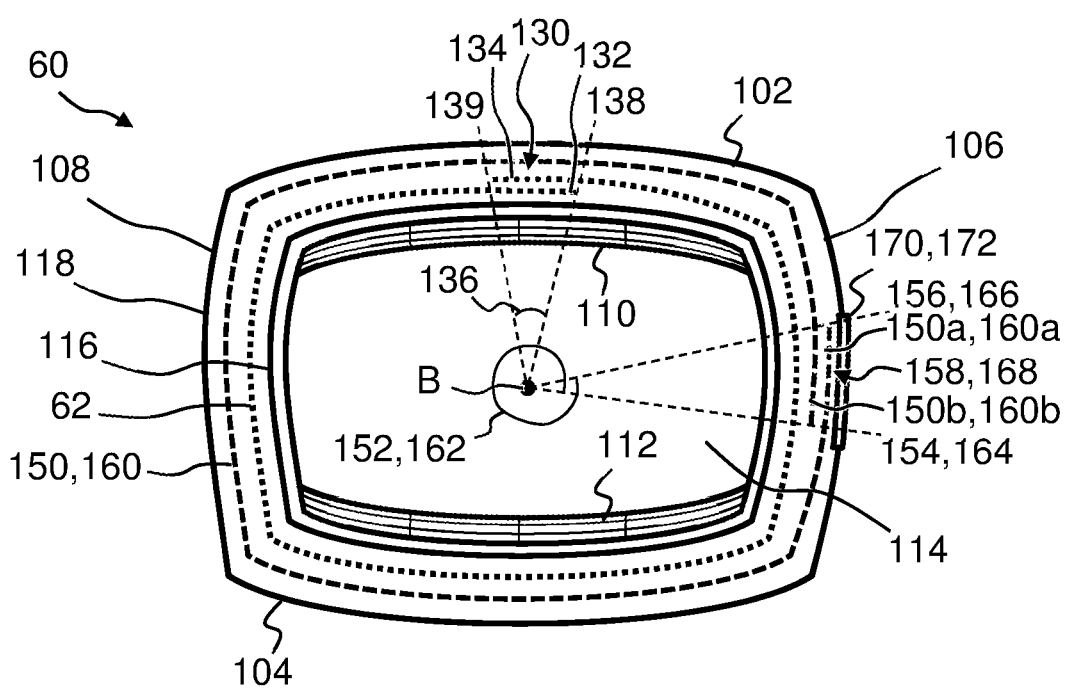

FIG. 7b is a schematic diagram illustrating a cross sectional view of an exemplary spar beam 60, such as the spar beam 60 of FIG. 7a. For illustrative purposes, the different elements of the spar beam 60 are shown separately. However, the different elements may be positioned against each other.

FIGS. 7a and 7b will be described together in the following.

The spar beam has a first beam side 102, a second beam side 104, a trailing edge beam side 106 and a leading edge beam side 108. The first beam side 102 or the second beam side 104 may be configured to face the pressure side or the suction side of the wind turbine blade. The trailing edge beam side 104 is configured to face the trailing edge of the wind turbine blade. The leading edge beam side 108 is configured to face the leading edge of the wind turbine blade.

The spar beam 60 comprises a plurality of fibre reinforced elements, such as pultruded carbon-fibre reinforced elements. For example, the spar beam 60 comprises a first fibre reinforced element 110 and a second fibre reinforced element 112. The fibre reinforced elements, such as the first fibre reinforced element 110 and the second fibre reinforced element 112 extends parallel to the spar beam axis B.

The spar beam 60 has a beam core 114. The beam core 114 may comprise one or more elements, such as foam elements to fill some or all of the interior of the spar beam 60. Alternatively, the beam core 114 may be hollow.

The spar beam 60 comprises a conductive beam sheath 62 circumscribing at least a beam sheath angular distance of the spar beam about the spar beam axis B and longitudinally extending from a fourth beam axis position to a fifth beam axis position (see e.g. FIGS. 5a and 5b).

The first fibre reinforced element 110 and the second fibre reinforced element 112 are positioned between the conductive beam sheath 62 and the spar beam axis B. Thereby, the conductive beam sheath 62 may protect the fibre reinforced elements 110, 112, possibly comprising electrically conductive fibres, from being subject to lightning strikes.

The spar beam comprises a first fibre reinforced layer 116 between the fibre reinforced elements 110, 112 and the conductive beam sheath 62. The first fibre reinforced layer 116 may be a biaxial fibre reinforced layer and/or may comprise one or more biaxial fibre sheets, such as a plurality, such as two, biaxial fibre sheets. The first fibre reinforced layer 116 may provide stability and strength to avoid or reduce internal stress to be transferred to the conductive beam sheath 62. Furthermore, the first fibre reinforced layer 116 may provide an electrical insulating layer between the fibre reinforced elements 110, 112 and the conductive beam sheath 62.

The spar beam 60 comprises a second fibre reinforced layer 118. The conductive beam sheath 62 is positioned between the second fibre reinforced layer 118 and the spar beam axis B. The conductive beam sheath 62 is positioned between the second fibre reinforced layer 118 and the first fibre reinforced layer 116. The second fibre reinforced layer 118 may be a biaxial fibre reinforced layer and/or may comprise one or more biaxial fibre sheets, such as a plurality, such as two, biaxial fibre sheets. The second fibre reinforced layer 118 may provide stability and strength to avoid or reduce stress in the conductive beam sheath 62

The conductive beam sheath 62 comprises a primary overlap 130 wherein a first primary beam sheath part 132 and a second primary beam sheath part 134 is overlapping. For example, the conductive beam sheath 62 may be provided as a single sheath being wrapped around the internal elements of the spar beam 60 to form the conductive beam sheath 62. The primary overlap 130 is located at the first beam side 102. However, the primary overlap 130 may be located at the second beam side 104. Alternatively or additionally, the conductive beam sheath 62 may comprise a secondary overlap 140, e.g. located at the second beam side 104.

The primary overlap 130 extends from an eighth beam axis position pb8 to a ninth beam axis position pb9. The primary overlap 130 may extend throughout the length of the beam sheath. The eighth beam axis position pb8 may be the fourth beam axis position pb4 (see e.g. FIG. 5a). The ninth beam axis position pb9 may be the fifth beam axis position pb5 (see e.g. FIG. 5a). The primary overlap may be at least 50 mm in a transverse direction, e.g. along the surface of the first beam side 102 and/or perpendicular to the spar beam axis B.

The primary overlap 130 extends a primary overlap angular distance 136 about the beam axis B. The primary overlap 130 extends from a first primary overlap angular position 138 to a second primary overlap angular position 139.

The spar beam comprises a first conductive beam cable 150 and a second conductive beam cable 160. The first conductive beam cable 150 circumscribes a first beam cable angular distance 152 about the spar beam axis B from a first primary beam cable angular position 154 to a first secondary beam cable angular position 156. The second conductive beam cable 160 circumscribes a second beam cable angular distance 162 about the spar beam axis B from a second primary beam cable angular position 164 to a second secondary beam cable angular position 166. The first conductive beam cable 150 and the second conductive beam cable 160 is connected to the conductive beam sheath 62. For example, the conductive beam cables 150, 160 may be in contact with the beam sheath 62 and/or the conductive beam cables 150, 160 may be soldered to the beam sheath 62. The conductive beam cables 150, 160 may be soldered to the beam sheath 62 at one or more sections along the conductive beam cables 150, 160 and/or the conductive beam cables 150, 160 may be non-soldered to the beam sheath 62 at one or more other sections along the conductive beam cables 150, 160. The conductive beam cables 150, 160 may be braided cable. The conductive beam cables 150, 160 may provide electrical connection from one side of the beam sheath 62 to another side of the beam sheath 62, e.g. from the leading edge beam side 108 to the trailing edge beam side 106.

The conductive beam sheath 62 is positioned between the first conductive beam cable 150 and the spar beam axis B. The conductive beam sheath 62 is positioned between the second conductive beam cable 160 and the spar beam axis B. The conductive beam cables 150, 160 is positioned between the second fibre reinforced layer 118 and the conductive beam sheath 62.

The first beam cable angular distance 152 is more than 360 degrees, e.g. providing a first beam cable overlap 158. The second beam cable angular distance 162 is more than 360 degrees, e.g. providing a second beam cable overlap 168. The beam cable overlaps 158, 168 may be more than 50 mm. The beam cable overlaps 158, 168 may comprise that a primary end part 150a, 160a of a conductive beam cable 150, 160 is contacting the respective opposite secondary end part 150b, 160b of the conductive beam cable 150, 160. However, alternatively, the primary end parts 150a, 160a may be arranged next to the secondary end parts 150b, 160b in the longitudinal direction of the spar beam, as illustrated in FIG. 7a. In another exemplary spar beam the first beam cable angular distance and/or the second beam cable angular distance may be less than 360 degrees, such as to not provide a beam cable overlap.

The beam cable overlaps 158, 168 are provided at the trailing edge beam side 106, as illustrated. The primary beam cable angular positions 154, 164 and the secondary beam cable angular positions 156, 166 are located at the trailing edge beam side 106.

The spar beam 60 comprises attachment positions, wherein the conductive beam sheath 62 is configured for connection with a down conductor configured for conducting lightning current to ground. For example, the spar beam 60 may comprise a first attachment position and/or a second attachment position, such as the sixth beam axis position pb6 and/or the seventh beam axis position pb7 (see e.g. FIG. 6a), respectively. The spar beam 60 comprises a first attachment disc 170 at the first attachment position, and a second attachment disc 172 at the second attachment position. The attachment discs 170, 172 may be soldered to the conductive beam sheath 62 and/or the conductive beam cables 150, 160. The attachment discs 170, 172 may be provided to protrude through the second fibre reinforced layer 118. For example, the second fibre reinforced layer 118 may be provided with holes around the attachment discs 170, 172.

Figure 7C:
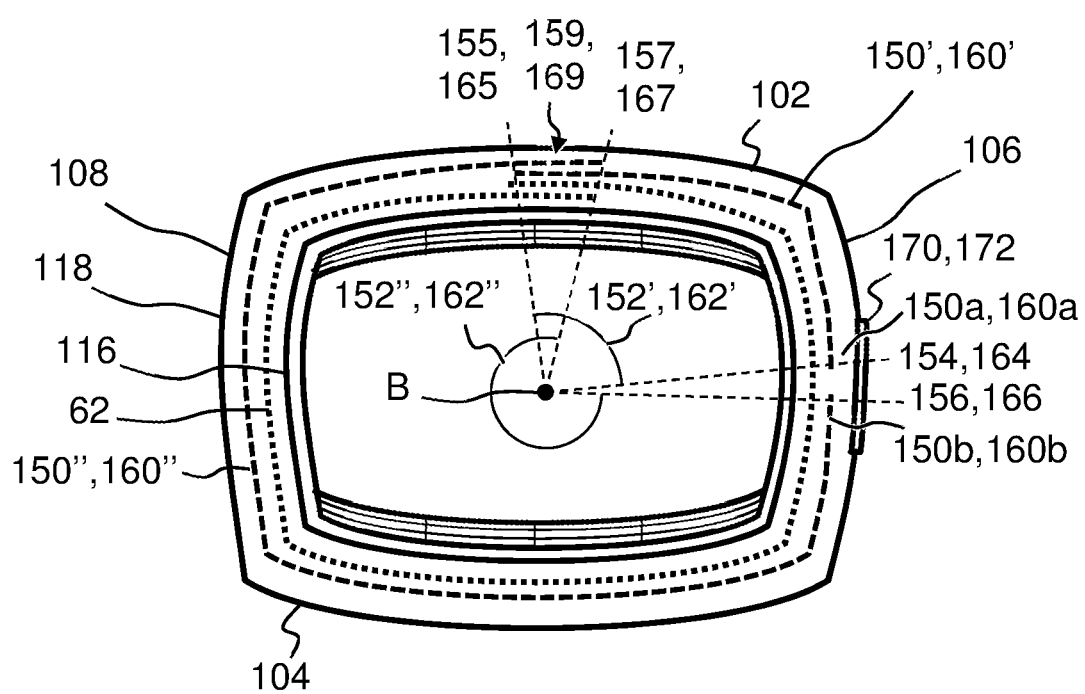

FIG. 7c schematically illustrates an alternative configuration of the conductive beam cables 150, 160 as described in relation to FIGS. 7a and 7b. As illustrated, the first beam cable angular distance and/or the second beam cable angular distance may be less than 360 degrees, such as to not provide a beam cable overlap at the trailing edge beam side 106.

Furthermore, as illustrated, conductive beam cables 150, 160, may be partitioned into a primary conductive beam cable 150', 160' and a secondary conductive beam cable 150", 160". Thus, the first conductive beam cable 150 comprises a first primary conductive beam cable 150' and a first secondary conductive beam cable 150". The second conductive beam cable 160 comprises a second primary conductive beam cable 160' and a second secondary conductive beam cable 160".

The primary conductive beam cable 150',160' circumscribes a primary beam cable angular distance 152', 162' about the spar beam axis B from the primary beam cable angular position 154, 164 to a tertiary beam cable angular position 155, 165. Thus, the first primary conductive beam cable 150' circumscribes a first primary beam cable angular distance 152' about the spar beam axis B from the first primary beam cable angular position 154 to a first tertiary beam cable angular position 155. The second primary conductive beam cable 160' circumscribes a second primary beam cable angular distance 162' about the spar beam axis B from the second primary beam cable angular position 164 to a second tertiary beam cable angular position 165.

The secondary conductive beam cable 150",160" circumscribes a secondary beam cable angular distance 152", 162" about the spar beam axis B from the secondary beam cable angular position 156, 166 to a quaternary beam cable angular position 157, 167. Thus, the first secondary conductive beam cable 150" circumscribes a first secondary beam cable angular distance 152" about the spar beam axis B from the first secondary beam cable angular position 156 to a first quaternary beam cable angular position 157. The second secondary conductive beam cable 160" circumscribes a second secondary beam cable angular distance 162" about the spar beam axis B from the second secondary beam cable angular position 166 to a second quaternary beam cable angular position 167.

The primary conductive beam cable 150',160' overlaps the secondary conductive beam cable 150",160", such as to form the respective conductive beam cable 150, 160. Thus, the first primary conductive beam cable 150' overlaps the first secondary conductive beam cable 150", such as to form a first secondary beam cable overlap 159, and such as to form the first conductive beam cable. The second primary conductive beam cable 160' overlaps the second secondary conductive beam cable 160", such as to form a second secondary beam cable overlap 169, and such as to form the first conductive beam cable. The secondary beam cable overlap 159, 169 may be provided on the first beam side as shown. However, alternatively, the secondary beam cable overlap 159, 169 may be provided on other sides, such as on the second beam side.

Figure 8:
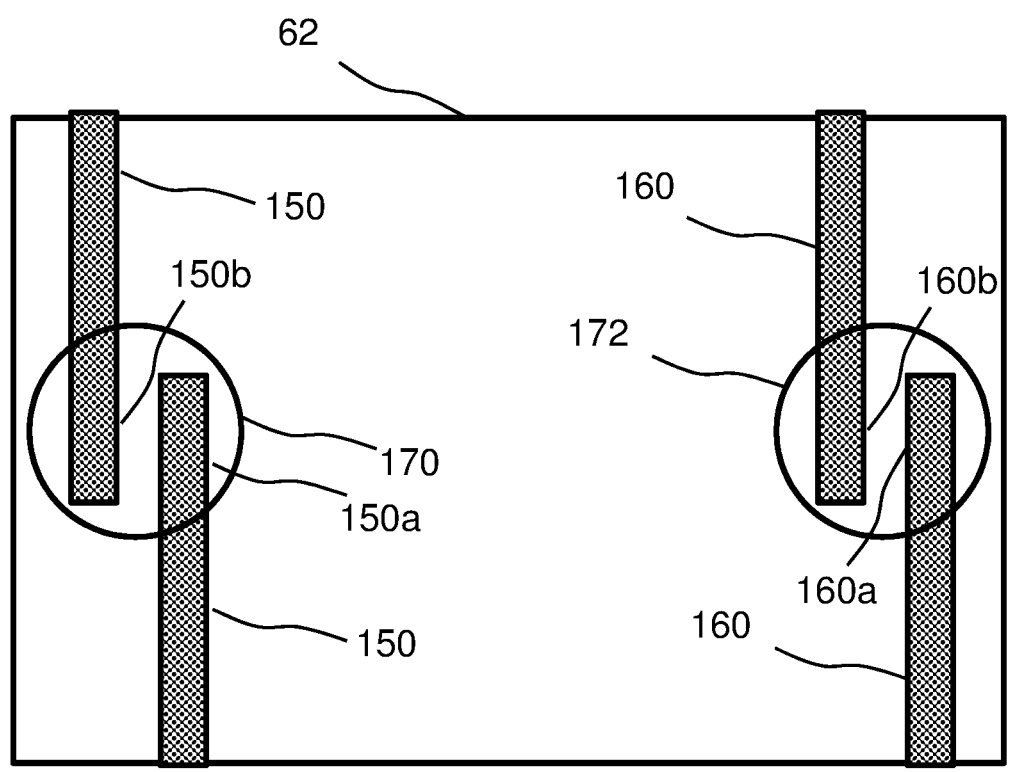
FIG. 8 is a schematic diagram illustrating a side of an exemplary beam sheath.

FIG. 8 is a schematic diagram illustrating the trailing edge beam side of an exemplary beam sheath 62, such as the beam sheath 62 as illustrated in relation to the previous figures.

The conductive beam sheath 62 is configured for connection with a down conductor at attachment positions. For example, a first attachment disc 170 may be provided at the first attachment position, and a second attachment disc 172 may be provided at the second attachment position. The attachment discs 170, 172 may be soldered to the conductive beam sheath 62 and/or the conductive beam cables 150, 160.

The first attachment disc 170 is provided on, such as to cover, a first primary end part 150a of the first conductive beam cable 150 and a first secondary end part 150b of the first conductive beam cable 150. As shown, the first primary end part 150a and the first secondary end part 150b may form a first beam cable overlap, as described in more detail with respect to FIG. 7b. However, alternatively, the first conductive beam cable 150 may be provides such as not to provide a first beam cable overlap.

The second attachment disc 172 is provided on, such as to cover, a second primary end part 160a of the second conductive beam cable 160 and a second secondary end part 160b of the second conductive beam cable 160. As shown, the second primary end part 160a and the second secondary end part 160b may form a second beam cable overlap, as described in more detail with respect to FIG. 7b. However, alternatively, the second conductive beam cable 160 may be provides such as not to provide a second beam cable overlap.

The attachment discs 170, 172 may provide attachment points for a down conductor (see e.g. FIG. 6a), such as to electrically connect the down conductor with the conductive beam sheath 62 and/or the conductive beam cables 150, 160. The conductive beam cables may provide a less resistive conductive path to the down conductor, such as to reduce the dependency of the conductance of the conductive beam sheath 62 to direct the current from a potential lightning strike to the down conductor, e.g. from an opposite side, e.g. the leading edge beam side, of the spar beam.

Figure 9:
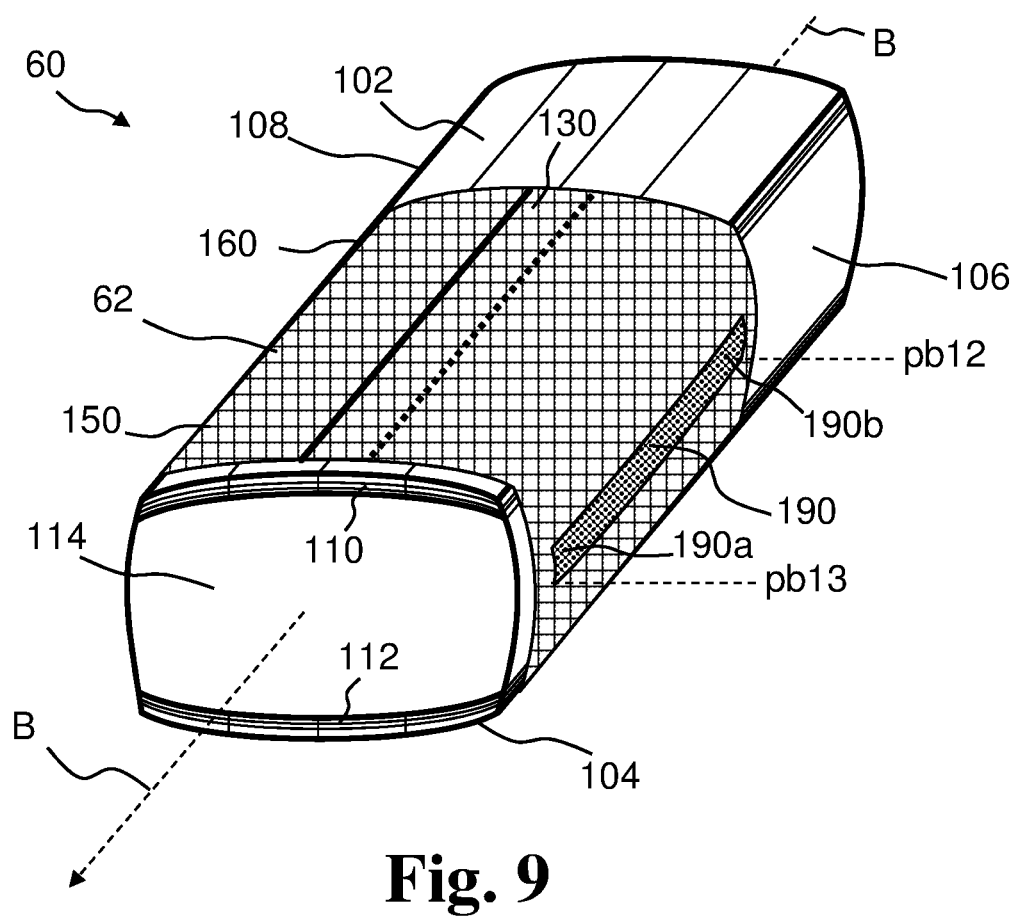
FIG. 9 is a schematic diagram illustrating an exemplary spar beam.

FIG. 9 is a schematic diagram illustrating an exemplary spar beam 60, such as the spar beam 60 as illustrated in the previous figures, however illustrating a third conductive beam cable 190. The third conductive beam cable 190 is extending in parallel with the beam axis B. The third conductive beam cable 190 extends from a twelfth beam axis position pb12 to a thirteenth beam axis position pb13. The third conductive beam cable 190 is positioned on the trailing edge beam side 106.

The attachment disc(s) 170, 172, as described in relation to FIG. 8, may be provided on, such as to cover, parts of the third conductive beam cable 190. For example, the first attachment disc 170 may be provided on, such as to cover, a third primary part 190b of the third conductive beam cable 190. The second attachment disc 172 may be provided on, such as to cover, a third secondary part 190b of the third conductive beam cable 190.

The third conductive beam cable 190 may be provided as an alternative to or in combination with transversely extending conductive beam cables, such as the first conductive beam cable 150 and/or the second conductive beam cable 160, as illustrated in FIG. 7a.

The term "receptor" is to be understood as an electrically conductive object being configured with a view to capturing and conducting a lightning current.

Throughout the disclosure, the term "conductive", if not specified otherwise, is to be understood as electrically conductive.

Numbered elements are provided purely for naming purposes to allow distinguishing between elements. Hence, numbering does not imply any order of importance, and the presence of a numbered element is not to be construed as implying the presence of any lower numbered elements. For example, a fourth element may be present without a corresponding first, second or third element.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
36 tip region
38 chord line
40 shoulder
42 shear web or spar side
44 first blade section
46 second blade section
50 first end
52 second end
60 spar beam
62 beam sheath
64 first conductive shell sheath
66 second conductive shell sheath
68 beam sheath angular distance
70 first sheath angular distance
72 second sheath angular distance
74 first spar cap
76 second spar cap
80 first down conductor
82 second down conductor
84 first lightning receptor
86 lightning receptor
90 receptor bracket
102 first beam side
104 second beam side
106 trailing edge beam side
108 leading edge beam side
110 first fibre reinforced element
112 second fibre reinforced element
114 beam core
116 first fibre reinforced layer
118 second fibre reinforced layer
130 primary overlap
132 first primary beam sheath part
134 second primary beam sheath part
136 primary overlap angular distance
138 first primary overlap angular position
139 second primary overlap angular position
140 secondary overlap
142 first secondary beam sheath part
144 second secondary beam sheath part
146 secondary overlap angular distance
148 first secondary overlap angular position
149 second secondary overlap angular position
150 first conductive beam cable
150' first primary conductive beam cable
160" first secondary conductive beam cable
150a first primary end part
150b first secondary end part
152 first beam cable angular distance
152' first primary beam cable angular distance
152" first secondary beam cable angular distance
154 first primary beam cable angular position
155 first tertiary beam cable angular position
156 first secondary beam cable angular position
157 first quaternary beam cable angular position
158 first beam cable overlap
159 first secondary beam cable overlap
160 second conductive beam cable
160' second primary conductive beam cable
160" second secondary conductive beam cable
160a second primary end part
160b second secondary end part
162 second beam cable angular distance
162' second primary beam cable angular distance
162" second secondary beam cable angular distance
164 second primary beam cable angular position
165 second tertiary beam cable angular position
166 second secondary beam cable angular position
167 second quaternary beam cable angular position
168 second beam cable overlap
169 second secondary beam cable overlap
170 first attachment disc
172 second attachment disc
190 third conductive beam cable
B spar beam axis
D1 first distance
D2 second distance
D3 third distance D4 fourth distance
L longitudinal axis
pa11 first primary sheath angular position
pa12 first secondary sheath angular position
pa21 second primary sheath angular position
pa22 second secondary sheath angular position
pb1 first beam axis position
pb2 second beam axis position
pb3 third beam axis position
pb4 fourth beam axis position
pb5 fifth beam axis position
pb6 sixth beam axis position
pb7 seventh beam axis position
pb8 eighth beam axis position
pb9 ninth beam axis position
pb10 tenth beam axis position
pb11 eleventh beam axis position
pb12 twelfth beam axis position
pb13 thirteenth beam axis position
pb14 fourteenth beam axis position
pb15 fifteenth beam axis position
ps1 first sheath position
ps2 second sheath position

The invention claimed is:

1. A spar beam for structurally connecting a first blade section and a second blade section of a wind turbine blade, wherein the wind turbine blade extends along a longitudinal axis from a root through a first airfoil region and a second airfoil region to a tip, Wherein the first blade section extends along the longitudinal axis to a first end and the second blade section extends along the longitudinal axis from a second end towards the tip, the first blade section comprising the first airfoil region, the second blade section comprising the second airfoil region, the first blade section and the second blade section comprising a pressure side, a suction side and a chord line extending between a leading edge and a trailing edge,
the spar beam longitudinally extending along a spar beam axis from a first beam end at a first beam axis position to a second beam end at a second beam axis position and being configured to be positioned such that the first beam axis position is located in the first airfoil region and the second beam axis position is located in the second airfoil region and a third beam axis position between the first beam axis position and the second beam axis position is aligned with the second end of the second blade section,
the spar beam having a first beam side configured to face the pressure side or suction side of the wind turbine blade, a trailing edge beam side configured to face the trailing edge of the wind turbine blade, and a leading edge beam side configured to face the leading edge of the wind turbine blade,
the spar beam comprising a conductive beam sheath circumscribing at least a beam sheath angular distance of the spar beam about the spar beam axis and longitudinally extending along the spar beam axis from a fourth beam axis position to a fifth beam axis position, and
the spar beam comprises a first fibre reinforced element including electrically conductive fibres and extending parallel to the spar beam axis, wherein the first fibre reinforced element is positioned between the conductive beam sheath and the spar beam axis and is configured to structurally connect the first and second blade sections.

2. The spar beam according to claim 1, wherein the first blade section extends from the root and comprises a root region, and/or wherein the second blade section extends to the tip and the second airfoil region comprises the tip.

3. The spar beam according to claim 1, wherein the fourth beam axis position and the fifth beam axis position are between the first beam axis position and the second beam axis position.

4. The spar beam according to claim 1, further comprising a first fibre reinforced layer between the first fibre reinforced element and the conductive beam sheath.

5. The spar beam according to claim 1, further comprising a second fibre reinforced layer, wherein the conductive beam sheath is positioned between the second fibre reinforced layer and the spar beam axis.

6. The spar beam according to claim 1, wherein the conductive beam sheath comprises a primary overlap wherein a first primary beam sheath part and a second primary beam sheath part is overlapping.

7. The spar beam according to claim 1, further comprising a first conductive beam cable circumscribing at least a first beam cable angular distance of the spar beam about the spar beam axis from a first primary beam cable angular position to a first secondary beam cable angular position, wherein the first conductive beam cable is connected to the conductive beam sheath.

8. The spar beam according to claim 1, further comprising a first attachment position, wherein the conductive beam sheath is configured for connection with a down conductor configured for conducting lightning current to ground.

9. The spar beam according to claim 1, wherein the conductive beam sheath is a mesh of electrically conductive material.

10. The spar beam according to claim 1, wherein the beam sheath angular distance is more than 90 degrees.

11. The spar beam according to claim 1, wherein the fifth beam axis position is the second beam axis position.

12. The spar beam according to claim 1, wherein the fifth beam axis position is between the fourth beam axis position and the second beam axis position.

13. The spar beam according to claim 1, wherein the fourth beam axis position is between the third beam axis position and the fifth beam axis position.

14. The spar beam according to claim 1, wherein the fourth beam axis position and the third beam axis position is separated by a first distance, the first distance being more than 10 mm.

15. A method for structurally connecting a first blade section with a second blade section of a wind turbine blade, the method comprising:
providing a spar beam according to claim 1 and the first and second blade section of the wind turbine blade;
positioning the spar beam such that the first beam axis position is located in the first airfoil region of the first blade section and the second beam axis position is located in the second airfoil region of the second blade section and the third beam axis position is aligned with the second end of the second blade section, and such that the first beam side is facing the pressure side or suction side of the wind turbine blade, the trailing edge beam side is facing the trailing edge of the wind turbine blade, and the leading edge beam side is facing the leading edge of the wind turbine blade; and
structurally connecting the first blade section and the second blade section via the spar beam.

16. The spar beam according to claim 1, wherein the electrically conductive fibres comprise carbon fibres.

17. A wind turbine blade extending along a longitudinal axis from a root through a first airfoil region and a second airfoil region to a tip, the wind turbine blade comprising a first blade section extending along the longitudinal axis to a first end and a second blade section extending along the longitudinal axis from a second end towards the tip, the first blade section comprising the first airfoil region, the second blade section comprising the second airfoil region, the first blade section and the second blade section comprising a pressure side, a suction side and a chord line extending between a leading edge and a trailing edge, the wind turbine blade comprising a spar beam structurally connecting the first blade section and the second blade section, the spar beam longitudinally extending along a spar beam axis from a first beam end at a first beam axis position to a second beam end at a second beam axis position and being positioned such that the first beam axis position is located in the first airfoil region and the second beam axis position is located in the second airfoil region and a third beam axis position, between the first beam axis position and the second beam axis position; is aligned with the second end of the second blade section, the spar beam having a first beam side facing the pressure side or suction side of the wind turbine blade, a trailing edge beam side facing the trailing edge of the wind turbine blade, and a leading edge beam side facing the leading edge of the wind turbine blade, the spar beam comprising a conductive beam sheath circumscribing at least a beam sheath angular distance of the spar beam about the spar beam axis and longitudinally extending along the spar beam axis from a fourth beam axis position to a fifth beam axis position, and the spar beam comprises a first fibre reinforced element including electrically conductive fibres and extending parallel to the spar beam axis, wherein the first fibre reinforced element is positioned between the conductive beam sheath and the spar beam axis and is structurally connecting the first and second blade sections.

18. The wind turbine blade according to claim 17, wherein the first blade section comprises a first down conductor configured for conducting lightning current to ground, and wherein the second blade section comprises a second down conductor configured for being connected to the first down conductor of the first blade section.

19. The wind turbine blade according to claim 18, wherein the second down conductor is electrically connected to the conductive beam sheath at a first attachment position, wherein the first attachment position is between the fourth beam axis position and the fifth beam axis position.

20. The wind turbine blade according to claim 17, wherein the electrically conductive fibres comprise carbon fibres.

\* \* \* \* \*